(12) United States Patent
Sepic

(10) Patent No.: US 9,077,786 B2
(45) Date of Patent: Jul. 7, 2015

(54) GRAPHICAL PHONE MENU SYSTEMS, METHODS AND ARTICLES

(71) Applicant: Smart Prompt, LLC, Mercer Island, WA (US)

(72) Inventor: Scott S. Sepic, Mercer Island, WA (US)

(73) Assignee: SMART PROMPT, LLC, Mercer Island, WA (US)

( * ) Notice: Subject to any disclaimer, the term of this patent is extended or adjusted under 35 U.S.C. 154(b) by 34 days.

(21) Appl. No.: 13/685,509

(22) Filed: Nov. 26, 2012

(65) Prior Publication Data
US 2014/0146953 A1    May 29, 2014

(51) Int. Cl.
| | |
|---|---|
| H04M 11/00 | (2006.01) |
| H04M 1/02 | (2006.01) |
| H04M 3/51 | (2006.01) |
| H04M 3/527 | (2006.01) |
| H04M 1/725 | (2006.01) |

(52) U.S. Cl.
CPC .............. *H04M 1/02* (2013.01); *H04M 3/5166* (2013.01); *H04M 3/5191* (2013.01); *H04M 3/527* (2013.01); *H04M 1/72522* (2013.01)

(58) Field of Classification Search
CPC ............................... H04M 2203/251–2203/254
USPC ................. 379/88.13, 88.23; 370/35, 395.61; 455/412.1; 704/275
See application file for complete search history.

(56) References Cited

U.S. PATENT DOCUMENTS

| | | | |
|---|---|---|---|
| 6,920,425 B1* | 7/2005 | Will et al. ...................... | 704/275 |
| 7,366,183 B1* | 4/2008 | Sylvain .................... | 370/395.61 |
| 8,228,925 B2 | 7/2012 | Cai et al. | |
| 8,280,029 B1 | 10/2012 | Tavernese, Jr. | |
| 8,291,043 B2 | 10/2012 | Hadley et al. | |
| 8,670,750 B2* | 3/2014 | Marusi et al. .............. | 455/412.1 |
| 2011/0286586 A1* | 11/2011 | Saylor et al. ............... | 379/88.13 |
| 2012/0015674 A1 | 1/2012 | LeBeau et al. | |
| 2012/0197967 A1 | 8/2012 | Sivavakeesar | |

* cited by examiner

*Primary Examiner* — Fan Tsang
*Assistant Examiner* — Van D Huynh
(74) *Attorney, Agent, or Firm* — Seed IP Law Group PLLC

(57) ABSTRACT

Prior to connecting a voice call between an end user and a system user, an automated customer interaction system configured by the system user can determine whether the end user's communications device is a recognized or registered device. Responsive to the determination that the end user's device is recognized or registered, the automated customer interaction system can initiate an interactive graphical session via a network data link to provide an interactive graphical session to the end user. Responsive to the determination that the end user's device is not recognized or registered or responsive to receipt of an input indicative of an end user's desire to initiate a voice call, the automated customer interaction system can initiate a voice call using a voice telephone network.

39 Claims, 14 Drawing Sheets

GRAPHICAL PHONE MENU SYSTEMS, METHODS AND ARTICLES

BACKGROUND

1. Technical Field

This disclosure generally relates to telephony, and more particularly to the provision of contextual graphical interfaces on communications devices featuring graphical displays, in place of conventional audio prompt phone menus.

2. Description of the Related Art

Many business employ audio prompt based automated voice call answering systems. Audio prompt based automated voice call answering systems were initially employed to determine the nature of the call in order to route the call to an appropriate human attendant or employee. The routing is based audio tones generated in response to key selections by the caller, in response to a number of audio prompts indicative of various menu options. Audio prompt based automated voice call answering systems are now also employed to provide a caller with answers to simple questions such as store hours or directions, account balances, order status, without requiring a human attendant or representative to actually speak with the caller. Again, the information is based audio tones generated in response to key selections by the caller, in response to a number of audio prompts indicative of various menu options. More recently, some audio prompt based automated voice call answering systems have the ability to recognize caller spoken input, which is typically provided in response to a number of audio prompts indicative of various menu options. The total number of options and sub-options for any particular menu is often very complex and convoluting, making these systems frustrating for a caller.

New systems and methods that streamline the voice call handling process are desirable.

BRIEF SUMMARY

Graphical prompts may be provided to a caller or user, in place or in lieu of audio prompts, where the caller or user is using a communications device having graphical display capabilities, such as a smart phone. In one implementation, an automated customer interaction system may determine whether a call is originating from a communications device having graphical display capabilities, and provide the graphical prompts to the caller or user accordingly. Such may also include establishing non-voice (e.g., data) communications with a server or other computer operated by or for the entity that the caller or user is attempting to reach. In another implementation, a communications device having graphical display capabilities may execute an application or applet, which recognizes attempts to phone or call certain telephone numbers or entities (e.g., registered telephone numbers or entities), and in response cause a graphical menu to be provided to the caller instead of audio prompts. Such may also include establishing non-voice (e.g., data) communications with a server or other computer operated by or for the entity that the caller or user is attempting to reach.

For example, an automated customer interaction system may be connected to one or more incoming voice call lines or "phone numbers" associated with a particular business or commercial entity. The automated customer interaction system may also be connected to one or more media servers, Web servers, or similar network or Internet portals that store Web pages in the form of text, audio, and video data and other data associated with one or more business or commercial Websites on the World Wide Web. In response to the detection of an incoming voice call, and prior to completing the voice call using an automated voice system or telephone attendant or representative, the automated customer interaction system can determine whether the call originated using a smart phone or another Internet connected device having graphical data display capabilities. Responsive to the determination that the call originated from either a device lacking network or Internet access or a device having insufficient graphical display capabilities, the call can be completed by the automated customer interaction system by forwarding or routing the incoming call through a local private branch exchange (PBX) or similar voice call switching device used to communicably couple the caller to an automated voice system, telephone attendant, or representative.

Responsive to the determination that the call originated from a device having network or Internet access and sufficient graphical display capabilities, the automated customer interaction system may complete the call by connecting the caller to an Internet Web portal, data store, or similar data server providing the caller with access to graphical data via the graphical display on their device or smart phone. In at least some instances, the data may be provided to the caller's device in a structured manner such as through the use of menus or other similar data structures. In at least some instances, the data may be provided via an interface with one or more external or third party suppliers. For example, Google Maps® may be used to provide locations or directions to a brick and mortar storefront operated by the party. Such data access can be seamlessly integrated with the automated customer interaction system to provide the caller with the ability to navigate through the data based on responses provided by the caller via the graphical interface on their device. The automated customer interaction system may also provide the caller with the ability to seamlessly exit the graphical interface and complete the voice call to an automated attendant, a human attendant, or one or more defined parties selected using at least a portion of the data provided by the caller to the automated customer interaction system via the graphical interface.

A method of automating customer interaction via a variety of types of communications devices may be summarized as including: receiving a plurality of inquiries by an automated customer interaction system, each of the received inquiries associated with a respective attempt at placing a call via each of a plurality of communications devices; and for each of the received inquires: determining, by the automated customer interaction system, whether the respective inquiry is logically associable with a respective one of a plurality of accounts; and for at least some of the received inquires: in response to determining that the respective inquiry is logically associable with a respective one of a plurality of accounts, causing at least one set of graphical prompts to be displayed by the respective communications device.

The method may further include: for each of at least some of the received inquires: in response to determining that the respective inquiry is not logically associable with a respective one of a plurality of accounts, causing an initial set of audio prompts to be audibly delivered to an end user by the respective communications device. Causing an initial set of audio prompts to be audibly delivered to an end user by the respective communications device may include transmitting, by the automated customer interaction system, the at least one set of audio prompts to the respective communications device over a data network. Causing an initial set of audio prompts to be audibly delivered to an end user by the respective communications device may include causing the communications device to complete the call via a voice network. The method may further include: for each of at least some of the received inquires: in response to determining that the respective inquiry is not logically associable with a respective one of a plurality of accounts, determining whether the respective communications device via which the call is attempted is capable of displaying graphical prompts and receiving user input in response to graphical prompts; and in response to determining that the respective communications device is capable of displaying graphical prompts and receiving user input in response to graphical prompts, causing at least an initial set of graphical prompts of the at least one set of graphical prompts to be displayed by the respective communications device. The method may further include: for each of at least some of the received inquires: in response to determining that the respective communications device is not capable of displaying graphical prompts and receiving user input in response to graphical prompts, causing an initial set of audio prompts to be audibly delivered to an end user by the respective communications device. Causing at least an initial set of graphical prompts to be displayed by the respective communications device may include causing an account credential specification set of graphical prompts of the at least one set of graphical prompts to be displayed by the respective communications device, where the account credential specification set of graphical prompts includes at least one graphical user selectable icon that: allows entry of allows entry of a set of account credentials by the end user of the respective communications device, the set of account credentials including at least a user identifier and a user pass code, the user pass code different from the user identifier and logically associated therewith in at least one nontransitory processor-readable medium or selection of which causes display of at least one user selectable icon that allows entry of a set of account credentials by the end user of the respective communications device. Causing at least an initial set of graphical prompts to be displayed by the respective communications device may include causing display of at least one user selectable icon that: allows entry of a user specific pass code by the end user of the respective communications device or selection of which causes display of at least one user selectable icon that allows entry of the user specific pass code by the end user of the respective communications device. Causing an initial set of graphical prompts of the at least one set of graphical prompts to be displayed by the respective communications device include causing display of a user selectable icon selection of which causes a voice connection with a human representative to be established via the communications device. Causing an initial set of graphical prompts of the at least one set of graphical prompts to be displayed by the respective communications device may further include causing a display of at least one graphical user selectable icon selection of which causes display of an account credential specification set of graphical prompts of the at least one set of graphical prompts to be displayed by the respective communications device, where the account credential specification set of graphical prompts includes at least one graphical user selectable icon that: allows entry of allows entry of a set of account credentials by the end user of the respective communications device, the set of account credentials including at least a user identifier and a user pass code, the user pass code different from the user identifier and logically associated therewith in at least one nontransitory processor-readable medium or selection of which causes display of at least one user selectable icon that allows entry of a set of account credentials by the end user of the respective communications device. The method may further include: receiving a user specific pass code entered by a user of the respective communications device; and attempting to verify the received user specific pass code. The method may further include: in response to successfully verifying the received user specific pass code, causing a navigation set of user selectable prompts of the at least one set of graphical prompts to be displayed by the respective communications device, the navigation set of graphical prompts including a number of user selectable icons selection of which causes display of at least one further set of graphical prompts by the respective communication device. The navigation set of graphical prompts may include a respective user selectable account icon for each of a plurality of accounts maintained for the respective end user. The method may further include: in response to selection of one of the user selectable account icons indicative of a respective one of the accounts, causing an actions set of user selectable graphical prompts to be displayed by the respective communications device, the actions set of graphical prompts including a number of user selectable action icons that specify respective actions specific to an account type of the selected one of the accounts. The method may further include: in response to selection of one of the user selectable action icons, causing information specific to the selected one of the accounts for the respective end user to be displayed by the respective communications device. The method may further include: in response to selection of one of the user selectable action icons, causing the communications device to display a user selectable location sharing icon selection of which causes a sharing of location information with the automated customer interaction system by the respective communications device; receiving location data by the automated customer interaction system in response to selection of the user selectable location sharing icon; in response to receiving location data, causing the communications device to display a map including information based at least in part of the received location data and based at least in part on the action associated with the selected one of the user selectable action icons. The method may further include: in response to selection of one of the user selectable action icons, causing the communications device to display a calendar interface for calendaring an event; receiving event information via the calendar interface; and in response to receiving the event information, calendaring the event in at least one calendar data store stored on at least one nontransitory processor-readable medium. The method may further include: causing the communications device to present a user selectable complete call icon, selection of which causes a completed call to be established via the communications device including a voice connection with a human representative. The method may further include: during the completed call, causing the communications device to present a user selectable screen sharing icon, selection of which causes the communications device to share a screen of the communications device with a remote entity. The method may further include: during the completed call, causing the communications device to present a user selectable image sharing icon, selection of which causes the communications device to share one or more images or video with a remote entity. The method may further include: during the completed call, causing the communications device to present a user selectable camera sharing icon, selection of which causes the communications device to share a camera of the communications device with a remote entity. The method may further include: during the completed call, causing the communications device to present a user selectable file sharing icon, selection of which causes the communications device to share a file with a remote entity. The method may further include: during the completed call, causing the communications device to present a user selectable contacts sharing icon, selection of which causes the communications device to share a contact's information with a remote entity. The method may further include: during the completed call, causing the communications device to present a user selectable icon selection of which causes the communications device to leave a voicemail message. The method may further include: causing the communications device to present a number of user enterable fields to specify at least one identifier associated with at least one of a good, a service or an account. The method may further include: receiving at least one identifier; receiving a date of availability for a specified one of the good or the service; electronically logging an order for the good or the service identified by the received identifier for the end user associated with the respective communications device or account. The method may further include: causing the communications device to present a number of user enterable fields to specify a date of availability for the good or service to be picked up or delivered. Determining whether the respective inquiry is logically associable with a respective one of a plurality of accounts may include determining whether the respective communications device via which the call is being attempted is logically associated with one of the plurality of accounts. Causing at least one set of graphical prompts to be displayed by the respective communications device may include transmitting, by the automated customer interaction system, the at least one set of graphical prompts to the respective communications device over a data network. Causing at least one set of graphical prompts to be displayed by the respective communications device may be performed in lieu of completing the call attempt at a then current time. The method may further include: causing the communications device to present a number of messages in a dedicated message field. The method may further include: causing the communications device to present a number of advertising messages in a dedicated advertising message field. The method may further include: for each of at least some of the received inquires: in response to determining that the respective received inquiry is logically associable with a respective one of a plurality of accounts, determining, by the automated customer interaction system, whether a language preference is associated with the respective communications device; in response to determining a language preference is associated with the respective communications device, causing the at least one set of graphical prompts in the preferred language associated with the communications device to be displayed by the respective communications device; and in response to determining a language preference is not associated with the respective communications device, causing the at least one set of graphical prompts in a default language to be displayed by the respective communications device. The method may further include: for each of at least some of the received inquires, in response to determining that the respective received inquiry is not logically associable with a respective one of a plurality of accounts, determining, by the automated customer interaction system, whether the respective communications device via which the call is attempted contains data indicative of a language preference associated with the respective communications device and whether the respective recipient communications device via which the call is attempted is capable of displaying graphical prompts and capable of receiving user input in response to graphical prompts; in response to determining a language preference is associated with the respective communications device and that the respective communications device is capable of displaying graphical prompts and receiving user input in response to graphical prompts, causing, by the automated customer interaction system, at least one set of graphical prompts in the preferred language to be displayed on the respective communications device; and in response to determining a language preference is not associated with the respective communications device and that the respective communications device is capable of displaying graphical prompts and receiving user input in response to graphical prompts, causing, by the automated customer interaction system, at least one set of graphical prompts in the default language to be displayed on the respective recipient communications device.

An automated customer interaction system to automate customer interaction via a variety of types of customer used communications devices may be summarized as including: at least one nontransitory processor-readable medium; at least one processor communicatively coupled to the at least one nontransitory processor-readable medium, the at least one processor which receives a plurality of inquiries, each of the received inquiries associated with a respective attempt at placing a call via each of a plurality of communications devices; and for each of the received inquires: determines whether the respective inquiry is logically associable with a respective one of a plurality of accounts; and for at least some of the received inquires: in response to a determination that the respective inquiry is logically associable with a respective one of a plurality of accounts, causes at least one set of graphical prompts to be displayed by the respective communications device.

For each of at least some of the received inquiries the at least one processor may, in response to a determination that the respective inquiry is not logically associable with a respective one of a plurality of accounts, cause an initial set of audio prompts to be audibly delivered to an end user by the respective communications device. For each of at least some of the received inquires the at least one processor may, in response to a determination that the respective inquiry is not logically associable with a respective one of a plurality of accounts, determine whether the respective communications device via which the call is attempted is capable of displaying graphical prompts and receiving user input in response to graphical prompts; and in response to a determination that the respective communications device is capable of displaying graphical prompts and receiving user input in response to graphical prompts, cause at least an initial set of graphical prompts of the at least one set of graphical prompts to be displayed by the respective communications device. The initial set of graphical prompts may include an account credential specification set of graphical prompts, where the account credential specification set of graphical prompts includes at least one graphical user selectable icon that: allows entry of allows entry of a set of account credentials by the end user of the respective communications device, the set of account credentials including at least a user identifier and a user pass code, the user pass code different from the user identifier and logically associated therewith in at least one nontransitory processor-readable medium or selection of which causes display of at least one user selectable icon that allows entry of a set of account credentials by the end user of the respective communications device. The initial set of graphical prompts may include at least one user selectable icon that: allows entry of a user specific pass code by the end user of the respective communications device or selection of which causes display of at least one user selectable icon that allows entry of the user specific pass code by the end user of the respective communications device. The at least one processor may receive a user specific pass code entered by a user of the respective communications device; and may attempt to verify the received user specific pass code and in response to successfully verifying the received user specific pass code, may cause a navigation set of user selectable prompts of the at least one set of graphical prompts to be displayed by the respective communications device, the navigation set of graphical prompts including a number of user selectable icons selection of which causes display of at least one further set of graphical prompts by the respective communication device. The navigation set of graphical prompts may include a respective user selectable account icon for each of a plurality of accounts maintained for the respective end user. In response to selection of one of the user selectable account icons indicative of a respective one of the accounts, the at least one processor may cause an actions set of user selectable graphical prompts to be displayed by the respective communications device, the actions set of graphical prompts including a number of user selectable action icons that specify respective actions specific to an account type of the selected one of the accounts. In response to selection of one of the user selectable action icons, the at least one processor may cause information specific to the selected one of the accounts for the respective end user to be displayed by the respective communications device. In response to selection of one of the user selectable action icons, the at least one processor may cause the communications device to display a user selectable location sharing icon selection of which causes a sharing of location information with the automated customer interaction system by the respective communications device; receiving location data by the automated customer interaction system in response to selection of the user selectable location sharing icon; in response to receiving location data, the at least one processor may cause the communications device to display a map including information based at least in part of the received location data and based at least in part on the action associated with the selected one of the user selectable action icons. In response to selection of one of the user selectable action icons, the at least one processor may cause the communications device to display a calendar interface for calendaring an event; receiving event information via the calendar interface; and in response to receiving the event information, may calendar the event in at least one calendar data store stored on at least one nontransitory processor-readable medium. The at least one processor may cause the communications device to present a user selectable complete call icon, selection of which causes a completed call to be established via the communications device including a voice connection with a human representative. During the completed call, the at least one processor may cause the communications device to present at least one of: a user selectable screen sharing icon, selection of which causes the communications device to share a screen of the communications device with a remote entity; a user selectable image sharing icon, selection of which causes the communications device to share one or more images or video with the remote entity; a user selectable camera sharing icon, selection of which causes the communications device to share a camera of the communications device with the remote entity; a user selectable file sharing icon, selection of which causes the communications device to share a file with the remote entity; a user selectable contacts sharing icon, selection of which causes the communications device to share a contacts information with the remote entity; or a user selectable icon selection of which causes the communications device to leave a voicemail message for the remote entity. The at least one processor may cause the communications device to present a number of user enterable fields to specify at least one identifier associated with at least one of a good, a service or an account. The at least one processor may receive at least one identifier; receive a date of availability for a specified one of the good or the service; electronically log an order for the good or the service identified by the received identifier for the end user associated with the respective communications device or account. The at least one processor may further cause the communications device to present a number of advertising messages in a dedicated advertising message field.

A method of automating customer interaction via a variety of types of communications devices may be summarized as including: receiving at least one respective call via each of a plurality of communications devices; and for each of the calls: determining whether the respective communications device via which the call is received is capable of displaying graphical prompts and receiving user input in response to graphical prompts; in response to determining that the respective communications device is capable of displaying graphical prompts and receiving user input in response to graphical prompts, causing at least one set of graphical prompts to be displayed by the respective communications device; and in response to determining that the respective communications device is not capable of displaying graphical prompts and receiving user input in response to graphical prompts, causing an initial set of audio prompts to be audibly delivered to an end user by the respective communications device.

The method may further include: determining whether the respective communications device is recognized before causing the at least one set of graphical prompts to be displayed by the respective communications device; and in response to determining that the communications device is recognized, causing a first initial set of graphical prompts of the at least one set of graphical prompts to be displayed by the respective communications device, where the first initial set of graphical prompts includes at least one user selectable icon that allows entry of a user specific pass code by the end user of the respective communications device or selection of which causes display of at least one user selectable icon that allows entry of the user specific pass code by the end user of the respective communications device. In response to determining that the communications device is not recognized, the method may further include causing a second initial set of graphical prompts of the at least one set of graphical prompts to be displayed by the respective communications device, where the second initial set of graphical prompts includes at least one graphical user selectable icon that allows entry of allows entry of a set of account credentials by the end user of the respective communications device, the set of account credentials including at least a user identifier and a user specific pass code, the user pass code different from the user identifier and logically associated therewith in at least one nontransitory processor-readable medium or selection of which causes display of at least one user selectable icon that allows entry of a set of account credentials by the end user of the respective communications device. The method may further include causing a first initial set of graphical prompts of the at least one set of graphical prompts to be displayed by the respective communications device may include causing display of a user selectable icon selection of which causes a voice connection with a human representative to be established via the communications device. The method may further include causing a first initial set of graphical prompts of the at least one set of graphical prompts to be displayed by the respective communications device may further include causing a display of at least one graphical user selectable icon that allows entry of allows entry of a set of account credentials by the end user of the respective communications device, the set of account credentials including at least a user identifier and a user specific pass code, the user pass code different from the user identifier and logically associated therewith in at least one nontransitory processor-readable medium. The method may further include: receiving a user specific pass code entered by a user of the respective communications device; and attempting to verify the received user specific pass code. In response to successfully verifying the received user specific pass code, the method may further include causing the a second set of user selectable prompts of the at least one set of graphical prompts to be displayed by the respective communications device, the second set of graphical prompts including a number of user selectable navigation icons selection of which causes display of at least one of additional user selectable icons or information. The second set of graphical prompts may include a plurality of user selectable account icons for respective ones of each of a plurality of accounts maintained for the end user. In response to selection of an account, the method may further include causing a third set of user selectable prompts of the at least one set of graphical prompts to be displayed by the respective communications device, the third set of graphical prompts including a number of user selectable action icons selection of which causes actions specific to a selected account. In response to selection of one user selectable action icon, the method may further include causing information to be displayed by the respective communications device. In response to selection of one user selectable action icon, the method may further include, causing the respective communications device to share location data; receiving location data in response to selection of the user selectable icon for sharing location data; and in response to receiving location data, causing the communications device to display a map including information based at least in part of the received location data. In response to selection of one user selectable action icon, the method may further include causing a display of a calendar interface by the communications device for calendaring an event; receiving event information; and in response to receiving event information, calendaring the event in at least one calendar data store on at least one nontransitory processor-readable medium. The method may further include causing the communications device to at least one of: present a user selectable icon selection of which causes the communications device to share a screen of the communications device with a remote entity; present a user selectable icon selection of which causes the communications device to share one or more images or video with the remote entity; present a user selectable icon selection of which causes the communications device to share a camera with the remote entity; present a user selectable icon selection of which causes the communications device to leave a voicemail message; or present a user selectable icon selection of which causes a voice connection with a human representative to be established via the communications device. The method may further include causing the communications device to present a number of user enterable fields to specify a identifier associated with a good, service, or account. The method may further include receiving the identifier associated with the good, the service, or the account; receiving a date of availability for the good or the service; electronically logging an order for the good or the service identified by the received identifier.

An automated customer interaction system to automate customer interaction via a variety of types of customer used communications devices may be summarized as including at least one nontransitory processor-readable medium; at least one processor communicatively coupled to the at least one nontransitory processor-readable medium.

A method of automating call recipient interaction via a variety of types of communications devices may be summarized as including generating a plurality of inquiries by an automated customer interaction system, each of the generated inquiries associated with a respective attempt at placing a call to each of a plurality of recipient communications devices; and for each of the generated inquires: determining, by the automated customer interaction system, whether the respective generated inquiry is logically associable with a respective one of a plurality of accounts; and for at least some of the generated inquires: in response to determining that the respective generated inquiry is logically associable with a respective one of a plurality of accounts, causing at least one set of graphical prompts to be displayed by the respective recipient communications device.

The method may further include for each of at least some of the generated inquires and in response to determining that the respective generated inquiry is not logically associable with a respective one of a plurality of accounts, causing an initial audio output to be audibly delivered to an end user by the respective recipient communications device. The method may further include for each of at least some of the generated inquires and in response to determining that the respective generated inquiry is not logically associable with a respective one of a plurality of accounts, determining, by the automated customer interaction system, whether the respective recipient communications device to which the call is attempted is capable of displaying graphical prompts and capable of receiving user input in response to graphical prompts; and in response to determining that the respective recipient communications device is capable of displaying graphical prompts and receiving user input in response to graphical prompts, causing, by the automated customer interaction system, at least an initial set of graphical prompts of the at least one set of graphical prompts to be displayed by the respective recipient communications device. The method may further include for each of at least some of the generated inquires and in response to determining, by the automated customer interaction system, that the respective recipient communications device is not capable of displaying graphical prompts and receiving user input in response to graphical prompts, causing an initial set of audio prompts to be audibly delivered to an end user by the respective recipient communications device. The method may further include for each of at least some of the generated inquires and in response to determining that the respective generated inquiry is logically associable with a respective one of a plurality of accounts, determining, by the automated customer interaction system, whether a language preference is associated with the respective recipient communications device; in response to determining a language preference is associated with the respective recipient communications device, causing the at least one set of graphical prompts displayed by the respective recipient communications device to be displayed in the preferred language associated with the communications device; and in response to determining a language preference is not associated with the respective recipient communications device, causing the at least one set of graphical prompts displayed by the respective recipient communications device to be displayed in a default language. The method may further include for each of at least some of the generated inquires and in response to determining that the respective generated inquiry is not logically associable with a respective one of a plurality of accounts, determining, by the automated customer interaction system, whether the respective recipient communications device to which the call is attempted contains data indicative of a language preference associated with the respective recipient communications device and whether the respective recipient communications device to which the call is attempted is capable of displaying graphical prompts and capable of receiving user input in response to graphical prompts; in response to determining a language preference is associated with the respective recipient communications device and that the respective recipient communications device is capable of displaying graphical prompts and receiving user input in response to graphical prompts, causing, by the automated customer interaction system, at least one set of graphical prompts to be displayed on the respective recipient communications device in the preferred language; and in response to determining a language preference is not associated with the respective recipient communications device and that the respective recipient communications device is capable of displaying graphical prompts and receiving user input in response to graphical prompts, causing, by the automated customer interaction system, at least one set of graphical prompts to be displayed on the respective recipient communications device in the default language.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

Figure 7A:
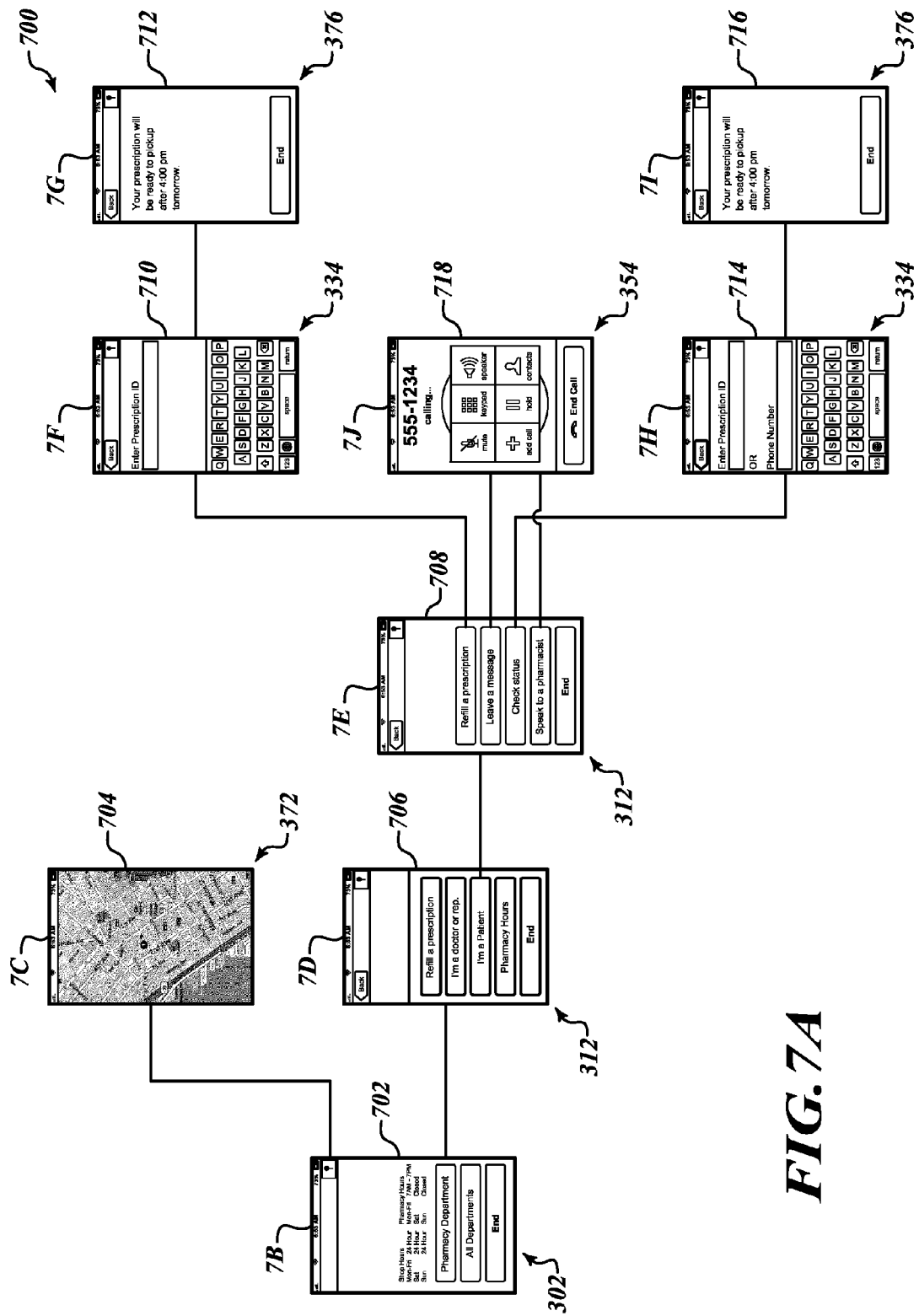
FIG. 7A is a graphical user interface screen map for an illustrative enhanced telephony service that shows a number of graphical user interface screens provided to a caller by the enhanced telephony service, according to one illustrated embodiment.
Figure 7C:
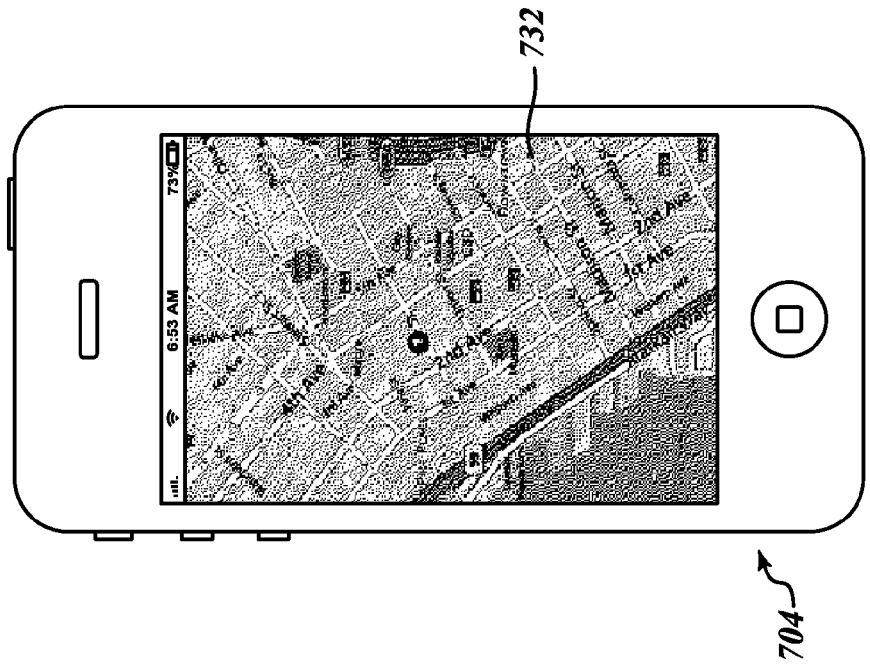
FIG. 7C is a graphical user interface screen that displays an illustrative image data screen provided by the enhanced telephony service responsive to a user input selecting the "LOCATE" button displayed on the graphical user interface entry menu shown in FIG. 7B, according to one illustrated embodiment.
Figure 7B:
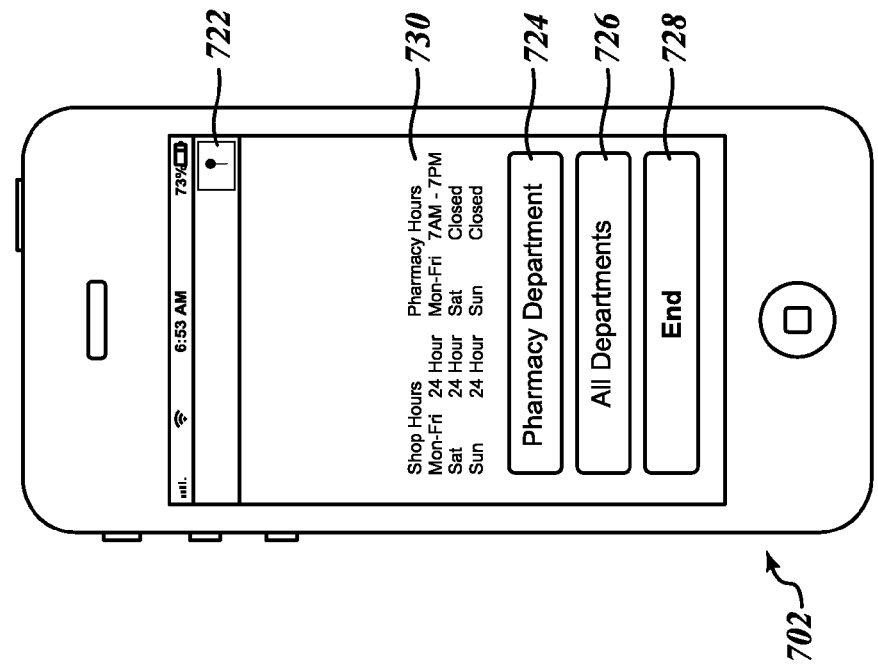
FIG. 7B is a graphical user interface screen that displays an illustrative home menu provided by the enhanced telephony service, according to one illustrated embodiment.
Figure 7E:
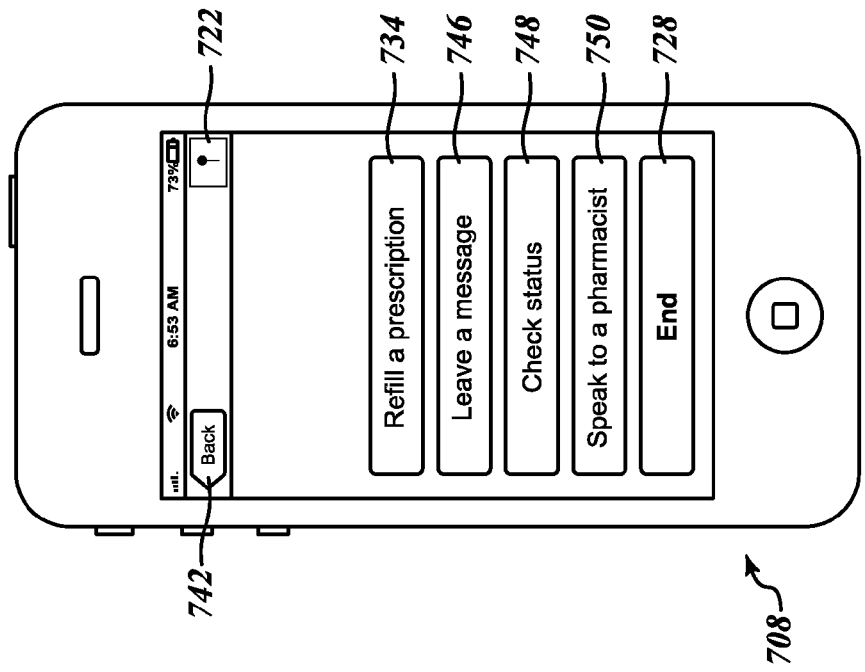
FIG. 7E is a graphical user interface screen that displays an illustrative selection menu screen provided by the enhanced telephony service responsive to a user input selecting the "I'M A PATIENT" button displayed on the graphical user interface entry menu shown in FIG. 7D, according to one illustrated embodiment.

button displayed on the graphical user interface entry menu shown in FIG. 7E, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known aspects of conventional telephonic devices such as private branch exchanges (PBXs), switches, routers, and the like, and well-known aspects of digital data exchange processes and protocols via local or wide area networks, graphical user interfaces, and the like have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments.

Figure 1:
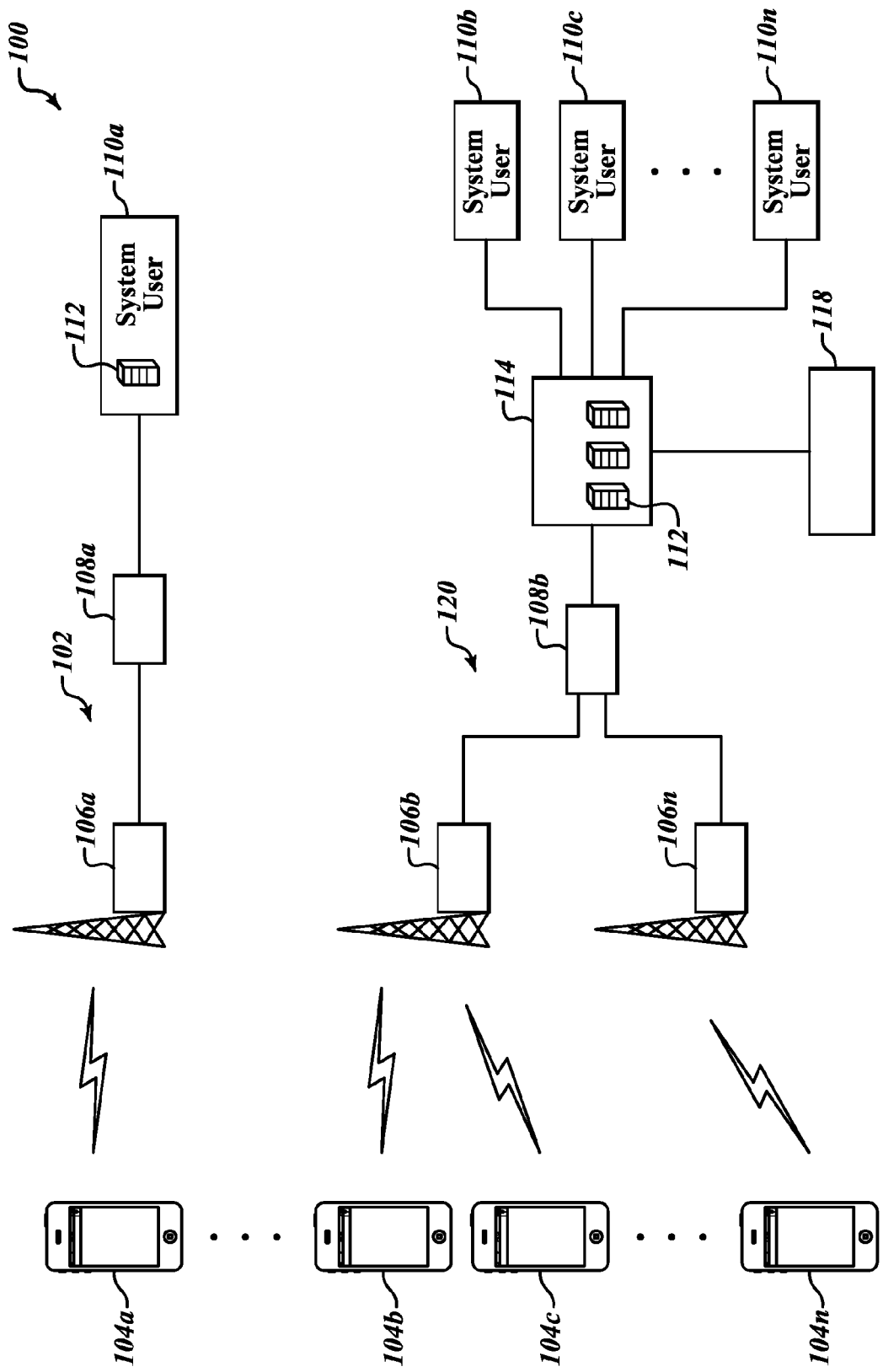
FIG. 1 is a block diagram showing an environment for two different enhanced telephony service implementations, a first implementation hosted by the system user and a second implementation hosted by a third party associated with one or more system users, according to one illustrated embodiment.

FIG. 1 shows a typical environment 100 in which a number of communications devices 104a-104n (collectively "communications devices 104"), each associated with a respective end user are used to communicate via voice telephony and graphical user interface with automated customer interaction systems 112 associated with system users 110a-110n (collectively "system users 110"). In at least some situations, some or all of the communications devices 104 include wireless communications devices such as cellular or mobile telephones. Where the communications devices 104 include cellular telephones, one or more wireless service providers 106a-106n (collectively "wireless service providers 106") may provide a portal or interface to one or more terrestrial networks including one or more networks for voice telephony, digital data transfer, analog data transfer or any combination thereof. The networks may transfer one or more types of data including person to person (P2P) voice telephony data, multiparty telephony data (i.e., conference calls), data sourced from one or more data networks such as a local area network, a wide area network, or a worldwide network such as the World Wide Web or Internet, or any combination thereof.

In communications system 102, the voice telephony and digital data communicated between the end user of communications device 104a and the system user 110a is routed through or sourced from one or more automated customer interaction systems 112 operated and configured by the system user 110a. In communications system 120, the voice telephony and digital data communicated between the communications devices 104b-104n and system users 110b-110n is routed through or sourced from one or more automated customer interaction systems 112 operated for the benefit of system users 110b-110n by a third party host or service provider 114. In at least some instances, at least a portion of the digital data provided to the communications device 104 may be provided by the system user 110 while the remaining portion of the digital data provided to the communications device 104 may be provided by a third party 118. Third parties 118 may include one or more entities that provide for example, one or more revenue generating services such as advertising or sponsorship that at least in part benefits at least one of the system user 110 or the service provider 114.

Voice telephony and data transfer between the communications devices 104 and the automated customer interaction systems 112 may be originated by either the end user of the communications device 104 or the system user 110 of the automated customer interaction system 112. Regardless of point of origination, prior to connecting a voice call between communications device 104 and the telephone system of the system user 110, the automated customer interaction system 112 determines whether the communications device 104 is recognized as being associated with one or more end users and whether the communications device 104 possesses graphical display capabilities sufficient to support the exchange of graphical data between the system 112 and the device 104.

In some implementations, such may be accomplished using one or more sets of logic or machine executable instructions (e.g., an application or "app") that is stored on and executed by, in whole or in part, the communications device 104. When an end user attempts to place a voice call to a telephone number that is identified as a system user 110 employing an automated customer interaction system 112, the application executed on the communications device can interrupt the voice call and establish a data link with the automated customer interaction system 112 or a similar data storage and retrieval device operated by on behalf of the system user 110 in lieu of connecting the voice call to the system user. The end user of the communications device 104 can then exchange data or information with the system user 110 via a number of graphical user interfaces displayed on the communications device 104. All or a portion of the graphical data displayed on the communications device 104 may be in the form of preloaded data or data stored in a nontransitory medium that is communicably coupled to the device 104, data that is pushed to the device 104 by the automated customer interaction system 112 via the previously established data link, or combinations thereof. Such can replace an audio prompt based automated call system with a graphical system that is capable of delivering contextually relevant data to the end user.

In other implementations, such may be accomplished as a simple lookup operation performed by the automated customer interaction system 112 to determine whether the communications device 104 is associated with an established end user account prior to connecting the voice call. Such may also be accomplished through the exchange of limited call setup information between the automated customer interaction system 112 and the communications device 104 prior to connecting the voice call. Such call setup information may include, at least, the type of communications device 104, whether the communications device 104 is graphics capable, one or more possible screen resolutions of the display provided on the communications device 104, and the like.

In the event the lookup operation preformed by the automated customer interaction system 112 fails to associate the call with an established account or in the event the call setup information indicates the communications device 104 lacks sufficient graphical display capabilities, the automated customer interaction system 112 may forward or otherwise route the call to the system user's voice call system for connection as a voice call over a voice calling transport network. In other events, when the lookup operation preformed by the automated customer interaction system 112 is able to associate the call with an established account or when the call setup information indicates the communications device 104 includes sufficient graphical display capabilities, the automated customer interaction system 112 can seamlessly and autonomously begin transferring graphical data to the communications device 104. Advantageously, the determination of whether the automated customer interaction system 112 routes the communication with the communications device 104 as voice call or graphical data call is transparent to the end user.

In at least some instances, the graphical data transferred to the communications devices 104 may include graphical data intended to interactively solicit input from the end user of the communications devices 104. Such data may include text data entry, option selection data entry, or combinations thereof. Generally, the graphical data provided by the automated customer interaction system 112 to the communications device 104 will seamlessly, autonomously, step or otherwise guide the end user of the communications device through an interactive process that is able to provide the end user with contextually relevant information based on data provided to the automated customer interaction system 112 by the end user via a graphical user interface on the communications device 104.

In at least some instances, the end user of the communications device 104 may desire to speak with a live attendant or representative rather than continue to communicate with the automated customer interaction system 112 through selection of graphical prompts. To address such an occurrence, the automated customer interaction system 112 provides a user selectable "opt out" icon or prompt on the communications device graphical interface. For example, the automated customer interaction system 112 can provide an "EXIT" or "SPEAK TO A REPRESENTATIVE" button or icon on the graphical interface that when selected by the end user, causes the automated customer interaction system 112 to terminate the graphical interface session and forward or otherwise route the call as a voice call to the system user 110.

Each communications device 104 may include any device, system or combination of systems and devices that are capable of providing an end user of the device with at least voice call capabilities. Examples of such include cellular telephones, personal digital assistants, tablet computers, laptop or portable computers, and the like. Each communications device 104 may be communicably coupled to a respective automated customer interaction system 112 through any number of interconnected, communicably coupled, wired or wireless networks. For example, some or all of the communications devices 104 may be wirelessly communicably coupled to a wireless service provider 106. Such connection between the communications device 104 and the wireless service provider 106 may be accomplished using one or more code division multiple access ("CDMA") connections, one or more global system for mobile communications ("GSM") connections, one or more third generation for mobile communications (3G) connections, one or more fourth generation for mobile communications (4G) connections, one or more WiMAX (IEEE 802.16, latest version) connections, or any other current or future developed wireless mobile communications protocol.

The wireless service provider 106 can include any local, regional, national, or worldwide provider of wireless services. In at least some instances, the wireless service provider 106 may include a provider of cellular service and the communications device 104 may include a device configured to communicate across the provider's cellular network using one or more defined industry standard or proprietary wireless service provider communications protocols. In at least some situations, the wireless service provider 106 may include a third party such as a coffee shop, commercial establishment, airport, or the like that provides a portal or access to a data network capable of supporting or otherwise carrying a voice call. Such may include, in one non-limiting example, an establishment such as a coffee shop or hotel that provides an IEEE 802.11 ("WiFi") compliant "hotspot" or similar that is capable of supporting voice over IP (VoIP) voice calling. Such may advantageously support the communicable coupling between the automated customer interaction system 112 and an end user having a communications device 104 that is capable of communication with a network other than a cellular network (e.g., a WiFi equipped device that is not communicably coupleable to either a 3G or 4G network).

In at least some instances, the wireless service provider 106 may operate any number of cellular towers that form a cellular network. The cellular network is communicably coupled to a number of mobile telephone switching offices (MTSOs) where calls transition between the cellular (i.e., wireless) network and the terrestrial (i.e., wired) network. In at least some instances, the wireless service provider 106 may be communicably coupled to one or more "land line" central offices 108*a*-108*b* (collectively "central offices 108") through which the call between the automated customer interaction system 112 and the communications device 104 may be switched or otherwise routed.

In at least some instances, such as that shown in system 102, the automated customer interaction system 112 may be physically located at a site under the control the system user 110. For example, the automated customer interaction system 112 may be housed in a stand alone or rack mounted server computer system disposed at each of the facilities operated by the system user 110. For example, where the system user 110 is a retail pharmacy chain, an automated customer interaction system 112 may be disposed at each of the brick and mortar retail pharmacy storefronts operated by the retail pharmacy chain. Such distributed automated customer interaction systems 112 may be linked by a public network, private network, or combination thereof to facilitate system management including system maintenance, repair, and updates. In another example, again using a retail pharmacy chain, the automated customer interaction system(s) 112 may be disposed in one or more centralized locations such as a local, regional, or national headquarters, IT center, or administrative center. Such a centralized automated customer interaction system 112 may enable all end users to contact the pharmacy chain using a common number (e.g., a "toll-free" number). Such a centralized system may facilitate routing of individual voice calls to a retail storefront meeting one or more defined conditions (e.g., physically closest to end user, having stock of a product selected by an end user, etc.).

In other instances, such as that shown in system 120, the automated customer interaction system 112 may be physically located at a site under the control of a third party host or service provider 114. For example, the automated customer interaction system 112 may be located on one or more stand alone or rack mounted servers maintained at an Internet service provider's location. In such instances, the service provider 114 may be communicably coupled to one or more system users 110 such that voice calls directed through the service provider (i.e., calls where the end user has made an entry on the communications device 104 indicative of a desire to speak with an attendant or a communications device 104 does not have or has inadequate graphics capabilities) are routed to one or more locations associated with the system user 110. For example, again using the retail pharmacy chain, Internet Service Provider A ("ISP A") 114 may receive all incoming calls. For those calls handled graphically, ISP A may communicate the necessary graphical interface input/output (I/O) data to the communications device 104. For voice calls, ISP A may forward the call to a retail storefront meeting one or more defined conditions (e.g., physically closest to end user, having stock of a product selected by an end user, etc.).

Although in some implementations much of the graphical data supplied to the communications device 104 originates with the system user 110, in at least some instances, one or more third parties 118 may supply at least a portion of the graphical data supplied to the communications device 104. In at least some instances, such graphical data may include revenue generating graphical data in the form of advertisements or similar, all or a portion of which is beneficially provided to the system user 110. In at least some instances, the graphical data supplied by the third party 118 can include targeted data that is based at least in part on the nature of the services or products offered by the system user 110. For example, a retail pharmacy system user may cause third party 118 to supply advertising related to one or more brands of vitamins or similar products one associates with a pharmacy. In at least some instances, the data supplied by the third party 118 can include targeted data that is based at least in part on demographic data associated with the end user associated with the communications device 104. In such instances, the third party 118 may supply different graphical data for display on some or all of the communications devices 104 based on one or more demographic factors associated with the end user of each respective communications device 104. For example, if demographic data indicates the end user is a 35 year old male, the third party 118 may supply graphical data in the form of advertising related to one or more products of interest to that particular demographic. In at least some instances, the data supplied by the third party 118 can include targeted data that is based at least in part on data associated with the communications device 104. For example, responsive to determining that the communications device 104 is a "Brand X" device, the data supplied by the third party may include advertising for applications executable on a "Brand X" device or malware/anti-virus software adapted to the operating system of the communications device 104.

Notably, in some instances, graphical data such as graphical prompts or screens may be stored on the communications device 104 itself. Such may be updated from time-to-time by downloads which may be pushed or pulled to the wireless communications device 104.

Figure 2:
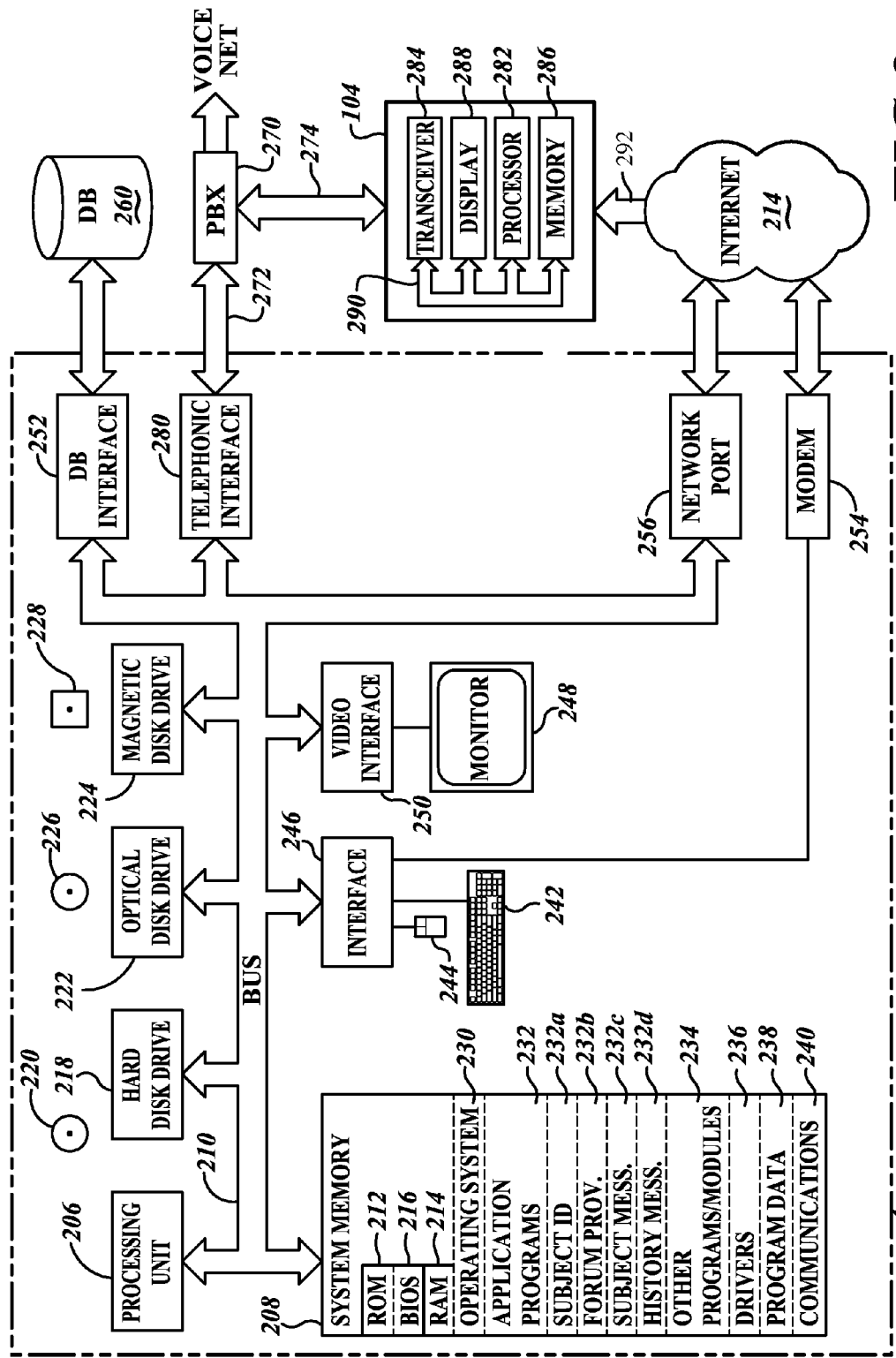
FIG. 2 is an operation level block diagram showing an example automated customer interaction system capable of delivering an enhanced telephony service, according to one illustrated embodiment.

FIG. 2 and the following discussion provide a brief, general description of the components forming an exemplary automated customer interaction system 112 and associated communications device 104 in which the various illustrated embodiments can be implemented. The automated customer interaction system 112 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The automated customer interaction system 112 may take the form of a conventional PC, server, or other computing system executing logic or other machine executable instructions. The automated customer interaction system 112 includes a processor 206, a system memory 208 and a system bus 210 that couples various system components including the system memory 208 to the processor 206. The automated customer interaction system 112 will at times be referred to in the singular herein, but this is not intended to limit the embodiments to a single system, since in certain embodiments, there will be more than one system or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the automated customer interaction system 112, such as during start-up. Some embodiments may employ separate buses for data, instructions and power.

The automated customer interaction system 112 also includes a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processing unit 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, provide nonvolatile storage of computer-readable instructions, data structures, program modules and other data for the automated customer interaction system 112. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, drivers 236 and program data 238.

The application programs 232 may include logic capable of providing information and data regarding one or more products or services offered by the system user. For example, where the system user is a retail pharmacy, specific applications may be provided for: accepting, verifying and scheduling prescription refills 232a, accepting and routing requests for generic pharmacy information 232b, accepting and routing physician access to the pharmacy department or pharmacy department records 232c, and accepting and routing patient access in pharmacy department or pharmacy department records 232d. The logic 232a-232d may, for example, be stored within the system memory 208 as one or more sets of logic or one or more sets of machine executable instructions.

As discussed in more detail below, the prescription refill logic 232a may include logic or instructions to provide the end user with access to a number of graphical interfaces that allow the end user to place an order to refill a previously authorized prescription. Such may include, for example, logic or machine executable instructions for a text entry screen to receive patient or prescription identification information entered by the end user, logic or machine executable instructions to verify that the prescription refill is valid and associated with a particular end user, logic or machine executable instructions for a text entry screen to receive desired pick-up time and date information entered by the end user, and logic or machine executable instructions to provide a text receipt or acknowledgement screen. As discussed in more detail below, the generic pharmacy information logic 232b may include logic or machine executable instructions to provide a text or graphic screen showing retail pharmacy operating hours or location information. As discussed in more detail below, the physician access to the pharmacy department logic 232c may provide the end user (i.e., a physician) with access to a number of graphical interfaces that permit the end user to order a prescription for patient pickup. Such may include, for example logic or machine executable instructions for a text entry screen to receive patient or prescription identification information entered by the end user, and logic or machine executable instructions to provide a text receipt or acknowledgement screen. Additionally, as discussed in more detail below, the patient access to the pharmacy department logic 232d may include logic or instructions to provide a text or graphic screen enabling a patient to order a prescription or speak with an associate in the pharmacy department.

The system memory 208 may include communications programs 240 that permit the automated customer interaction system 112 to access and exchange data with other networked systems or components, such as other automated customer interaction systems 112, an external computer system, a telephonic interface 280, or the like.

While shown in FIG. 2 as being stored in the system memory 208, the operating system 230, application programs 232, other programs/modules 234, drivers 236, program data 238 and communications 240 can be stored on the hard disk 220 of the hard disk drive 218, the optical disk 226 of the optical disk drive 222 and/or the magnetic disk 228 of the magnetic disk drive 224.

Authorized personnel can enter commands (i.e., system maintenance, upgrades, etc.) and information (i.e., product information, pricing, sales, etc.) into the automated customer interaction system 112 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the automated customer interaction system 112, for example when the system is installed on the system user's premises. In other instances, the input devices may be located remote from the automated customer interaction system 112, for example when the system is installed on the premises of a service provider.

In some embodiments, the automated customer interaction system 112 operates in an environment 100 (FIG. 1) using one or more of the logical connections to optionally communicate with one or more remote computers, servers and/or other devices via one or more communications channels, for example, one or more networks such as the network 214. These logical connections may facilitate any known method of permitting computers to communicate, such as through one or more LANs and/or WANs. Such networking environments are well known in wired and wireless enterprise-wide computer networks, intranets, extranets, and the Internet.

In some embodiments, a network interface 256, communicatively linked to the system bus 210, may be used for establishing and maintaining communications over the network 214. Further, the data store interface 252, which is communicatively linked to the system bus 210, may be used for establishing communications with a data store 260 located on one or more computer-readable media 260. For example, such a data store 260 may include a repository for storing information regarding end user account information, end user communications device 104 information, system user specific information relevant to providing one or more products or services to the end user (e.g., a retail pharmacy system user 110 may store end user prescription information to provide feedback concerning adverse drug interactions to the end user), or combinations thereof. In some embodiments, the database interface 252 may communicate with a remote data store via the network 214.

In an environment 100 (FIG. 1), program modules, application programs, or data, or portions thereof, can be stored in another server computing system (not shown). Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and interfaces 246, 252 are illustrated as communicatively coupled to each other via the system bus 210, thereby providing connectivity between the above-described components. In alternative embodiments of the object evaluation computer 204, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

The automated customer interaction system 112 can further include at least one telephonic interface 280 that is communicably coupled to the bus 210. The telephonic interface can include any system, device or combination of systems and devices suitable for controlling, forwarding, routing, or otherwise switching one or more voice calls received by the automated customer interaction system 112 to a voice call system, for example to a private branch exchange 270 or similar voice call switching or handling device via one or more interfaces 272. For example, upon receipt of an incoming call from a communications device 104 associated with an established account or having suitable graphical display capabilities, the automated customer interaction system 112 may communicate one or more graphical interface screens to the communications device 104 via the network port 256 and network 214. The end user of the communications device 104 can interact with the automated customer interaction system 112 by providing input using the graphical interface or other input devices native to the communications device 104. If the end user of the communications device 104 indicates a desire to speak with an attendant or other designated party, the automated customer interaction system 112 can transfer, forward or otherwise route the established graphical session with the communications device to an external voice telephony network such as the PBX 270 or similar voice call switching device via the telephonic interface 280.

The communications device 104 can include any device, system or combination of systems and devices having at least voice calling capabilities. In some instances, the communications device 104 can include additional devices, systems, or combinations of systems and devices capable of providing graphical data display capabilities in addition to voice calling capabilities. Examples of such communications devices 104 can include without limitation, cellular telephones, smart phones, tablet computers, laptop computers, ultraportable computers, handheld devices, and the like. In at least some instances, the communications device 104 can include at least one processor 282, at least one transceiver 284, a nontransitory memory 286 and a display 288. Some or all of the components within the communications device 104 may be communicably coupled using at least one bus 290 or similar structure adapted to transferring, transporting, or conveying data between the devices, systems, or components used within the communications device 104.

The processor 282 includes any type of processor adapted to execute one or more machine executable instruction sets, for example a conventional microprocessor, a reduced instruction set computer (RISC) based processor, an application specific integrated circuit (ASIC), digital signal processor (DSP), or similar. Within the processor 282, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 282 upon initial application of power. The processor 282 may also execute one or more sets of logic or one or more machine executable instruction sets loaded from the memory 286 subsequent to the initial application of power to the processor 282. The processor 282 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc) that are not shown in FIG. 2 may be communicably coupled to the processor 282 to provide additional functionality such as geolocation data and three-dimensional position data to the processor 282.

The transceiver 284 can include any device capable of transmitting and receiving electromagnetic energy. Non-limiting example transceivers include a CDMA transceiver, a GSM transceiver, a 3G transceiver, a 4G transceiver, an LTE transceiver, and any similar current or future developed mobile device transceiver having at least one of a voice telephony capability or a graphical data exchange capability. In at least some instances, the transceiver 284 can include more than one interface. For example, in some instances, the transceiver 284 can include at least one dedicated, full- or half-duplex, voice call interface and at least one dedicated data interface. In other instances, the transceiver 284 can include at least one integrated interface capable of contemporaneously accommodating both full- or half-duplex voice calls and data transfer.

The memory 286 can at least include a non-volatile storage memory, and in some embodiments may also include a volatile memory as well. At least a portion of the memory 286 is used to store one or more machine executable instruction sets for execution by the processor 282. In some embodiments, all or a portion of the memory 286 may be disposed within the processor 282, for example in the form of a cache. In some embodiments, the memory 286 may additionally include non-volatile memory in the form of electromagnetic storage (e.g. a rotating hard disk drive), electrostatic storage (e.g. a solid state drive) or any combination thereof. In some embodiments, the memory 286 may be supplemented with one or more slots configured to accept the insertion of one or more removable memory devices such as a secure digital (SD) card, a compact flash (CF) card, a universal serial bus (USB) memory "stick", or the like.

In at least some implementations, one or more sets of logic or machine executable instructions providing applications or "apps" executable by the processor 282 may be stored in whole or in part in at least a portion of the memory 286. Such applications may be executed continuously, for example in the form of a "background app" that is continuously executed by the processor 282 but not continuously visible to the end user. In at least some instances, the applications may be downloaded or otherwise acquired by the end user, for example using an online marketplace such as the Apple App Store, Amazon Marketplace, or Google Play marketplaces. In some implementations, such applications may detect an occurrence where the end user is placing a call to a known, recognized, or registered automated customer interaction system 112 operated by a system user 110. In other implementations, such applications may detect an occurrence where an incoming call is originating from a known, recognized, or registered automated customer interaction system 112 operated by a system user 110. In either implementation, the application can facilitate establishing a data link between the communications device 104 and the automated customer interaction system 112 via the transceiver 284 and network 214 prior to connecting the voice call. In at least some instances, the application executed on the communications device 104 may include a number of user configurable settings to limit or otherwise filter inbound and outbound connections to an automated customer interaction system 112.

The communications device 104 also contains one or more user interfaces 288 permitting user entry of data including, for example, responses, text entry and the like entered by the end user responsive to the graphical display provided by the automated customer interaction system 112. The user interface 288 may employ one or more graphical output or data display devices. The user interface 288 may further include one or more input devices or systems such as an alphanumeric keypad, a QWERTY keyboard, a joystick, scroll wheel or similar physical or virtual input device. In one example, the user interface 288 may include only a single input device such as a touchpad, or even one or more user selectable switches or actuators, while in other instances the user interface 288 may include a plurality of input devices, for example a touchscreen input device and a conventional or virtual keypad or keyboard such as those found on many small form factor electronic devices.

In some embodiments, the user interface 288 may comprise a touchscreen. The touchscreen can include any type of touchscreen including, but not limited to, a resistive touchscreen or a capacitive touchscreen. Individual icons and controls, for example virtual buttons or slider controls that are both intuitive and useful for communicating instructions, commands, and data to the automated customer interaction system 112 may be displayed on the touchscreen user interface 288.

The bus 290 bi-directionally and communicably couples the memory 124, processor 282, user interface 288, and transceiver 284 to each other. The bus 290 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 290.

In at least some instances the automated customer interaction system 112 may initiate a call to a communications device 104 identified only by a unique identification number such as a telephone number. In some situations, the automated customer interaction system 112 may be used to place outbound calls directed to any number of communications devices 104. In at least some instances, such calls may be placed only to those communications devices that have been registered and authenticated by the automated customer interaction system 112. In at least some instances, a local or remote data store including data identifying recognized or registered landline and mobile communications devices 104 having graphical display capabilities and recognized or registered landline and mobile communications devices 104 lacking graphical display capabilities may be communicably coupled to the automated customer interaction system 112. Such would enable the automated customer interaction system 112 to place graphical interface "calls" via one or more network data links 292 to those devices identified as having graphical capabilities and place voice calls, for example using an automated attendant communicably coupled to the system 112, to those devices identified as lacking graphical capabilities.

As the interaction with the end user progresses, the end user may express a desire to initiate a voice call with either an attendant or representative via the graphical interface or similar user selection or user input on the communications device 104. In some instances, upon receipt of an input indicative of an end user's desire to engage in a voice call, the automated customer interaction system 112 can provide the end user with a telephone directory or similar listing that permits the end user to select the desired party with whom to connect via the voice call. In other instances, upon receipt of an input indicative of an end user's desire to engage in a voice call, the automated customer interaction system 112 can connect the end user to an appropriate party based upon information provided by the end user during the interactive graphical session.

Upon receipt of an input indicative of a desire to engage in a voice call, the automated customer interaction system 112 may seamlessly and autonomously transition the network data link 292 with the communications device 104 to a voice network connection 274 with the communications device 104. Such may be accomplished, for example, by initiating, establishing, transferring, forwarding or otherwise routing a voice call to an appropriate telephone number or telephone extension associated with the attendant or designated party via the telephonic interface 280 and the PBX 270 or similar voice call switching device. In at least some instances, the automated customer interaction system 112 can terminate, drop, or otherwise sever the network data link 292 after a voice network connection 274 is established between the device 104 and the PBX 270 or similar voice call network.

Alternatively, if the automated customer interaction system 112 determines from the call setup information provided by the communications device 104 is unrecognized, unregistered or not associated with an authorized account holder or that the device 104 does not have sufficient graphical display capabilities, the automated customer interaction system 112 may advantageously, autonomously, and seamlessly forego establishing a network data link 292 with the device 104 and complete the call as a voice call. Such actions may be performed by the automated customer interaction system 112 in a manner that is transparent to the end user of the communications device 104.

Figure 3A:
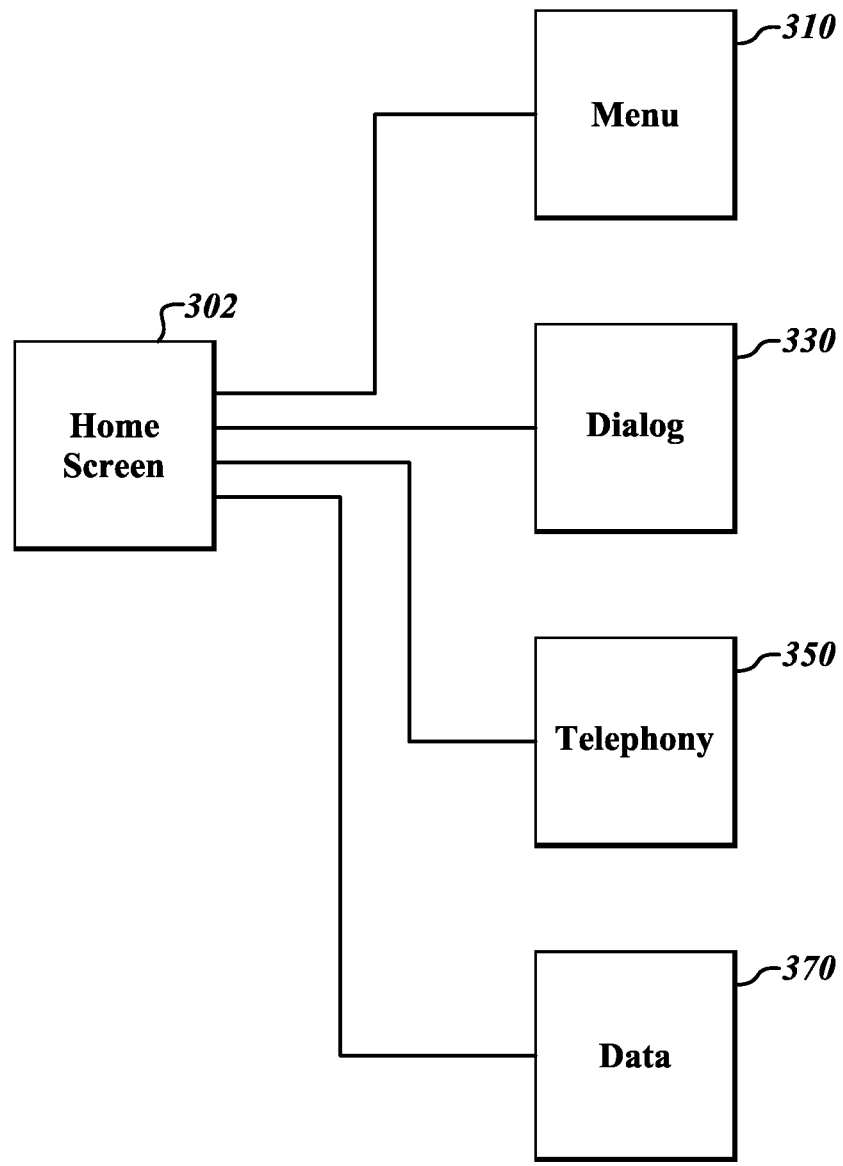
FIG. 3A is a high level operational diagram showing various high level functions and functional relationships accessible from an illustrative graphical interface home screen generated by an automated customer interaction system, according to one illustrated embodiment.

FIGS. 3A-3E show a number of illustrative, graphical interface screen classes that may be provided to the communications device 104 by the automated customer interaction system 112. FIG. 3A is a high-level breakdown showing four illustrative screen classes that may be provided to the end user of the communications device 104. Such screen classes may include, but are not limited to: menu screens 310 providing the end user with a number of predefined selectable icons; dialog screens 330 providing the end user with a number of text boxes into which alphanumeric characters may be entered; telephony screens 350 providing the end user with one or more voice call options; and data screens 370 providing the end user with non-interactive data such as maps. FIGS. 3B-3E each provide a breakdown one of the four illustrative screen classes shown in FIG. 3A to provide a more detailed discussion of an illustrative number of graphical user interface screens that can be provided by the automated customer interaction system 112 to the communications device 104. It should be understood that the screens described with respect to FIGS. 3A-3E are of an illustrative nature and that screen types that are either not discussed or are combinations of those discussed separately in FIG. 3A-3E may be provided to suit the unique needs of system users 110. Such screens and screen classes, although not discussed in detail herein, should be considered as falling within the scope of this disclosure.

Prior to connecting a voice call between communications device 104 and the system user telephone system, the automated customer interaction system 112 can determine whether the communications device 104 is recognized or registered as a device having graphical display capabilities. Such a determination may, at times, be based on receipt of a response from an application executed at least in part on the communications device 104 that provides the automated customer interaction system 112 with an indication that the device 104 is able and authorized to engage in an interactive graphical session in lieu of a voice call. Such a determination may, at times, be based on the receipt of a request from an application executed at least in part on the communications device 104 to initiate an interactive graphical session with the automated customer interaction system 112. Such a determination may, at times, be based on a telephone number lookup performed by the automated customer interaction system 112 on an incoming call to determine whether the communications device 104 is associated with the call is an authorized account holder. Such a determination may, at times, be based on an exchange of call setup information between the communications device 104 and the automated customer interaction system 112 prior to connection of the voice call. If the automated customer interaction system 112 identifies the communications device 104 as a recognized or registered device having sufficient graphical display capabilities, the system 112 can attempt to establish a network data link 292 with the device 104 in lieu of connecting the initial voice call.

During the initial exchange of graphical data between the automated customer interaction system 112 and the communications device 104, logic or machine executable instructions executed by the automated customer interaction system 112 can present to the end user a home screen on user interface 288 of the communications device 104. The home screen 302 provides the end user with the opportunity to exchange information with the automated customer interaction system 112. Generally, the options presented on the home screen 302 are intended to elicit information from the end user that enables the automated customer interaction system 112 to streamline the provision of relevant data to the end user via the user interface 288. Input may be provided to the automated customer interaction system 112 using any number of methods. For example, on the home screen 302 an end user may be presented with a selectable options menu containing predefined options selected by the system user 110, a text entry field in which alphanumeric characters, date, time, etc. data may be entered using a physical or virtual input device such as a keyboard, or combinations thereof.

Figure 3B:
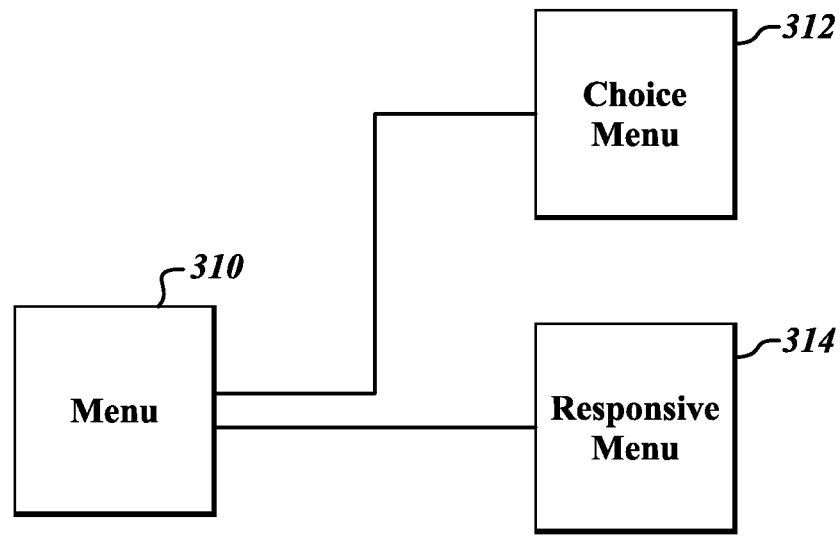
FIG. 3B is a high level operational diagram showing additional high level functions and functional relationships accessible from an illustrative graphical interface menu screen generated by an automated customer interaction system, according to one illustrated embodiment.

Referring now to FIG. 3B which provides a number of non-limiting menu screen 310 examples, in some situations the automated customer interaction system 112 may provide a menu screen 310 responsive to the receipt of end user input. The menu screen 310 may display a number of selectable buttons or similar selectable icons on the user interface 288.

In some instances, the menu screen 310 may include a choice menu screen 312 that displays a number of pre-labeled, end user selectable buttons or other virtual icons on the user interface 288. Such may be useful where a relatively small number of finite options are available to the end user. For example, the choice menu 312 for a retail pharmacy may display buttons on the user interface 288 labeled, "PHARMACY," "PHOTO," "COSMETICS," and "OTHER" to solicit an input by the end user indicating a desired department within the store.

In other instances, the menu screen 310 may include a responsive menu screen 314 that displays a number of pre-labeled, end user selectable buttons or other virtual icons on the user interface 288. The labels on the selectable buttons or other virtual icons are indicative of answers to a query provided on the responsive menu screen 314. In at least some instances, upon receipt of the end user input via the responsive menu screen 314, the automated customer interaction system 112 can follow a logic or decision tree that presents the end user with additional, contextually relevant, queries or information. Such may provide be useful for screening or otherwise parsing the nature of the inquiry by the end user. For example, the responsive menu 314 for a retail pharmacy may display a question such as "IS THIS PRESCRIPTION FOR YOU OR SOMEONE ELSE?" along with two buttons, one labeled "MYSELF" another labeled "SOMEONE ELSE."

Figure 3C:
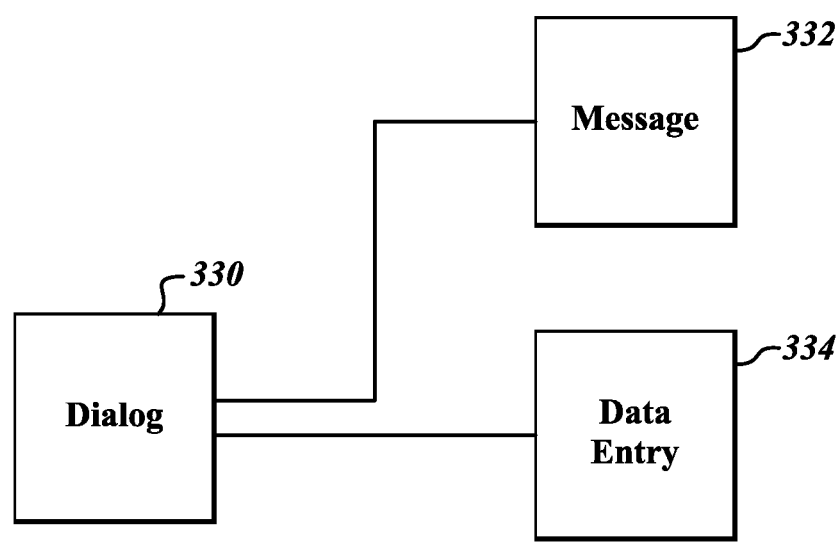
FIG. 3C is a high level operational diagram showing additional high level functions and functional relationships accessible from an illustrative graphical interface dialog screen generated by an automated customer interaction system, according to one illustrated embodiment.

Referring now to FIG. 3C which provides a number of non-limiting dialog screen 330 examples, in some situations the automated customer interaction system 112 may provide a dialog screen 330 responsive to the receipt of end user input. In at least some instances, the dialog screen 330 may include one or more text or alphanumeric character entry fields displayed on the user interface 288. Responsive to a prompt on the dialog screen 330 that is provided by the automated customer interaction system 112, the end user may provide alphanumeric input on the dialog screen using either of a physical or virtual keyboard on the communications device 104. The alphanumeric data can then be used by the automated customer interaction system 112 to provide additional, contextually relevant, data or services to the end user.

In at least some instances, the dialog screen 330 may include a message screen 332 that includes a text box used to exchange one or more text messages with the automated customer interaction system 112, for example via a short message service (SMS) or similar. Such messages may, in some instances, be forwarded to a system attendant or other system user representative by the automated customer interaction system 112. The receipt of data provided via the message screen 332 may advantageously provide the ability for the automated customer interaction system 112 to respond to end user inquiries that have not been coded into the system in the form of logic or machine executable instructions.

In at least some instances, the dialog screen 330 can include a data entry screen 334 that is provided by the automated customer interaction system 112 and includes a text box for the entry of alphanumeric input by the end user. Non-limiting examples include, USER ID and LOGON by which the automated customer interaction system 112 can receive a unique user identification and authentication code, PAYMENT by which the automated customer interaction system 112 can receive end user entered payment data, PRESCRIPTION # by which the automated customer interaction system 112 can receive unique prescription identifiers, MAILING INFORMATION from which the automated customer interaction system 112 can receive an end user's mailing address. For example, a data entry screen 334 for a retail pharmacy may display a text box labeled "PRESCRIPTION #" where an end user patient or physician can enter an alphanumeric string corresponding to a new or existing prescription filled by the pharmacy. In another example, a data entry screen 334 for a retail pharmacy may display a text box labeled "PICK-UP DATE" by which the automated customer interaction system 112 can receive data indicative of a desired pick up date for a prescription. Such data may be entered by the end user via a text box and virtual keyboard on the communications device, via a calendar having selectable date icons, or via calendar scroll wheels or similar date entry icons.

Figure 3D:
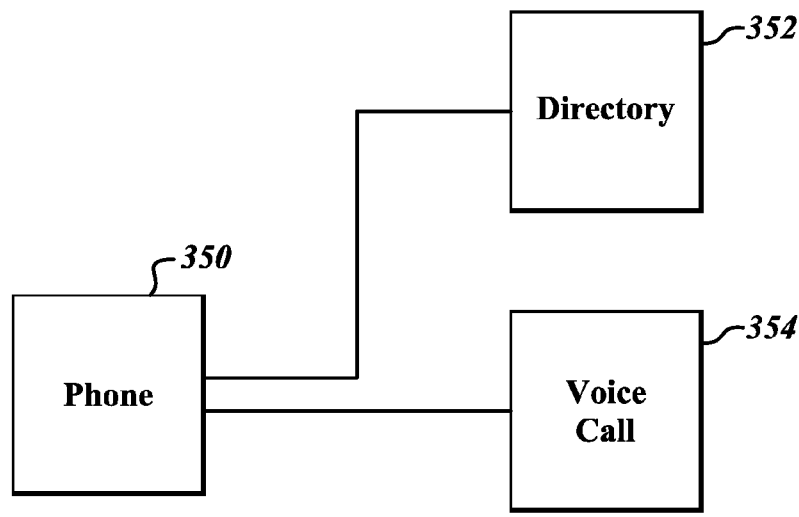
FIG. 3D is a high level operational diagram showing additional high level functions and functional relationships accessible from an illustrative graphical interface telephony screen generated by an automated customer interaction system, according to one illustrated embodiment.

Referring now to FIG. 3D which provides a number of non-limiting telephony screen 350 examples, in some situations, the automated customer interaction system 112 can provide a telephony screen 350 to the end user responsive to the receipt of end user input. The telephony screen 350 may include one or more text or alphanumeric character entry fields displayed on the user interface 288.

In at least some instances, the telephony screen 350 can include a telephone directory screen 352 that may be provided to the end user by the automated customer interaction system 112 responsive to an input provided by the end user. In at least some instances, the telephone directory screen 352 can include one or more physical or virtual numeric or alphanumeric keypads from which the automated customer interaction system 112 can receive one or more end user telephone directory search inputs.

In other instances, the telephony screen 350 can include a voice call screen 354 that may be displayed to the end user responsive to an input by the end user indicative of a desire to connect a voice call with an attendant or system user representative. In at least some instances, the voice call screen 354 can include all or a portion of the native voice call telephone screen provided by the communications device operating system (e.g., iOS, Android®, Windows Phone®, Windows 8®, etc.). In at least some instances, upon display of the voice call screen 354, the automated customer interaction system 112 relinquishes the ability to interact with the communications device 104 and the voice call between the communications device 104 and the selected party is connected as with a conventional voice call.

Figure 3E:
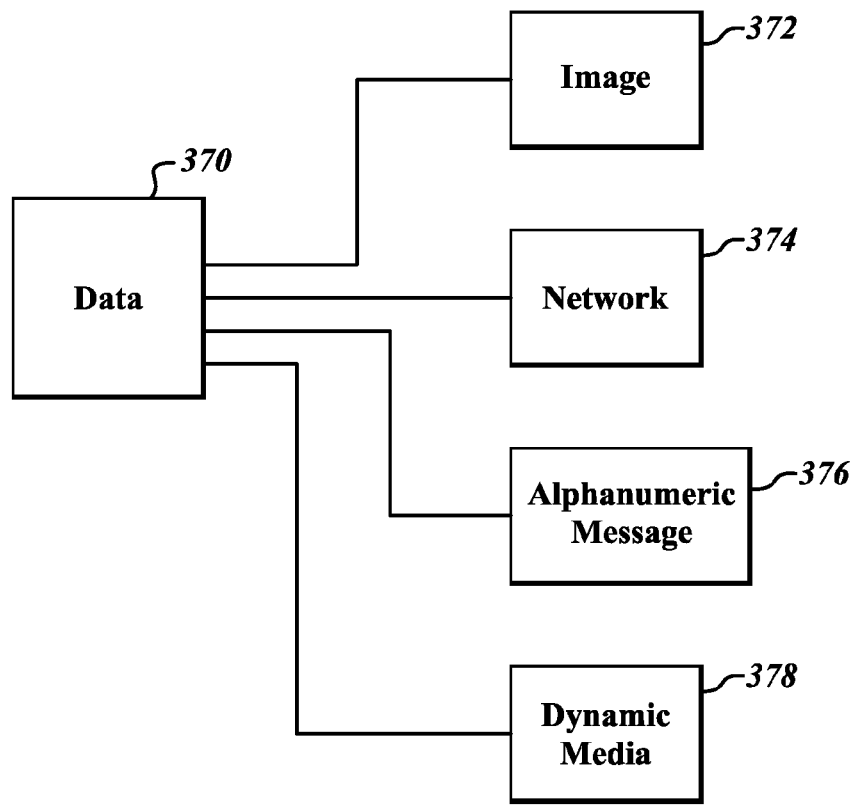
FIG. 3E is a high level operational diagram showing additional high level functions and functional relationships accessible from an illustrative graphical interface data delivery screen generated by an automated customer interaction system, according to one illustrated embodiment.

Referring now to FIG. 3E which provides a number of non-limiting data screen 370 examples provided by the automated customer interaction system 112. In at least some instances, the automated customer interaction system 112 can provide the data screen 370 responsive to input received from the end user, for example if the end user selects a "MAP" icon on the communications device. In other instances, the automated customer interaction system 112 may autonomously provide the data screen 370 to the end user responsive to one or more logical events, for example a confirmation screen indicating "YOUR PRESCRIPTION WILL BE READY AT 3:45 P.M. on 12/1/2012" responsive to an end user input indicative of a desire to refill a prescription. The data screen 370 can therefore include text, images, video, audio, or virtually any combination or mixture thereof.

In at least some instances, the data screen 370 can include image data 372. Such image data may include a static image such as a one dimensional (e.g., barcode) or two dimensional (e.g., quick reference or QR code) machine readable symbol to provide access to an event (e.g., concert, show, game, etc.) or to a particular product or service (e.g., airline ticket, ferry pass, gate pass, etc.). Such image data may be autonomously generated and displayed by the communications device based on time, date, location, or combinations thereof. For example, a GPS enabled communications device 104 may autonomously display a machine readable symbol providing access to a flight when the communications device 104 detects via the GPS that the end user is at the geographic location corresponding to the originating airport for the flight. In another example, an IEEE 802.11 (WiFi) enabled communications device may autonomously display a machine readable symbol granting the end user access to a sporting event when the communications device detects a WiFi signal provided by the stadium hosting the event. In other instances, image data may include dynamic images that change based on one or more communications device parameters. For example, responsive to receipt of an end user's order for movie tickets from a theater chain, the automated customer interaction system 112 may autonomously display a map showing all of the chain theaters in the local area along with directions to the nearest theater.

In other instances, the data screen 370 can include a network data screen 374. Such may include hypertext markup language (HTML) sourced from one or more public networks (e.g., the Internet), private networks (e.g., personal or corporate intranet), or any combination thereof. Such network data screens 374 may be provided as the result of the receipt of end user input by the automated customer interaction system 112. For example, the end user may provide an input corresponding to selection of a hyperlink to a network HTML page. Such network data screens 374 may also be provided autonomously by the automated customer interaction system 112. For example, responsive to the receipt of an order for tickets to a Broadway musical, the automated customer interaction system 112 may redirect the end user's communications device 104 to an Internet Website providing interesting facts or background regarding the musical.

In yet other instances, the data screen 370 can include a non-interactive, alphanumeric message screen 376. Such message screens 376 can include order acknowledgements, instructions, directions, and the like. Such message screen 376 displays may be generated autonomously by the automated customer interaction system 112 responsive to one or more inputs received via the end user's communications device 104.

In other instances, the data screen 370 can include a dynamic media screen 378 useful to provide audio, video, or audio/visual media to the end user. Such may include media sourced from the automated customer interaction system 112 or from one or more network storage devices or services communicably coupled to the system 112. For example, responsive to the receipt of an order for concert tickets, the automated customer interaction system may autonomously play a short audio/visual presentation (e.g., an MPEG, WMV, or MP4 file) on the end user's communication device 104 that shows band members thanking the end user for the purchase or playing a song in a new music video. Such may advantageously provide a feeling of additional value to the end user, encouraging the end user to make additional purchases or to interact further with the automated customer interaction system 112. In another example, responsive to the receipt of a prescription for an epinephrine auto-injector, the automated customer interaction system 112 may autonomously play a short audio/visual presentation on the end user's communication device 104 that shows the proper method of using the auto-injector to treat acute allergic reactions or treat the onset of anaphylactic shock.

Figure 4:
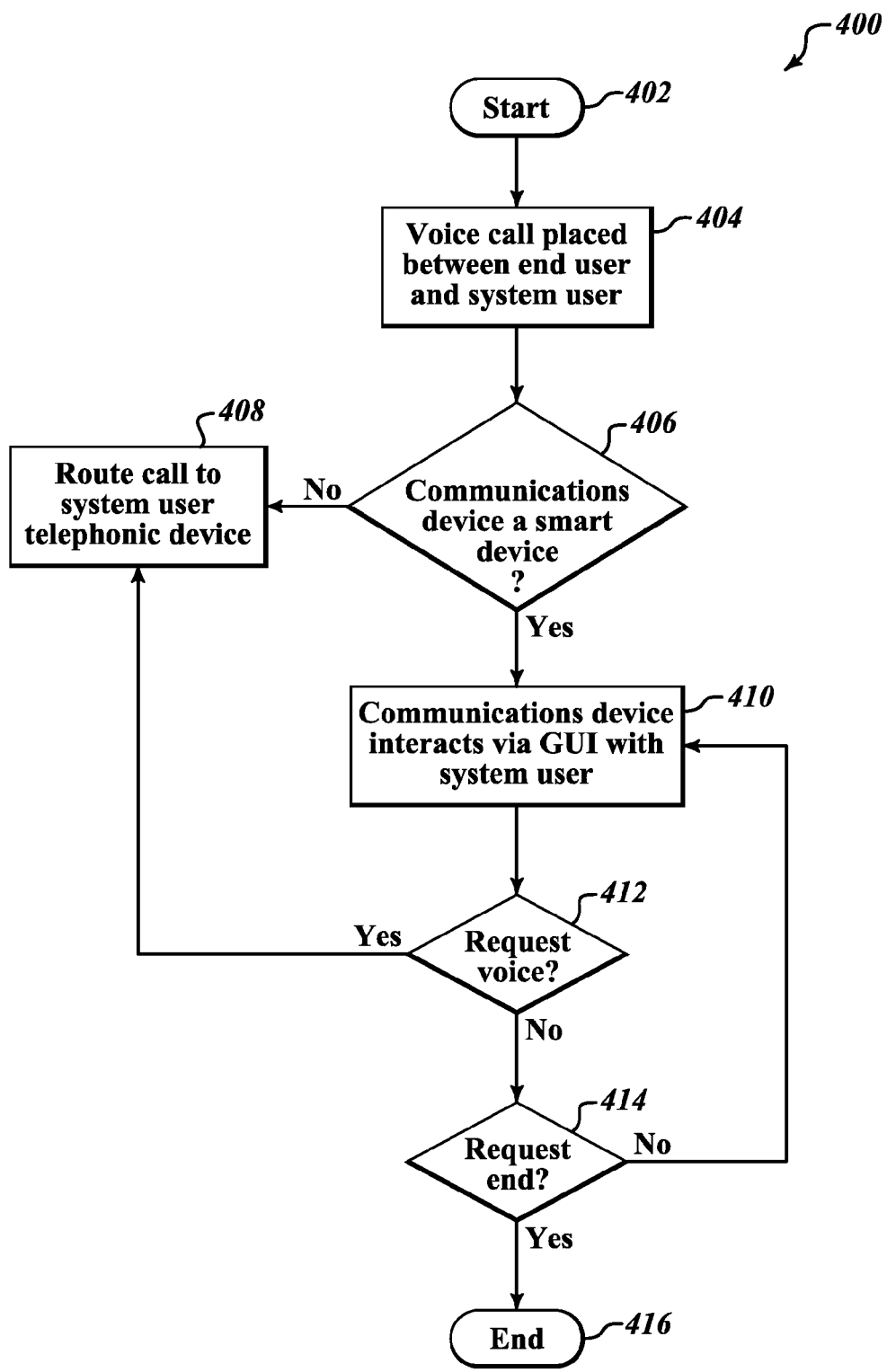
FIG. 4 is a high level logic flow diagram of a method of operation to provide an illustrative enhanced telephony service, according to one illustrated embodiment.

FIG. 4 shows an example method 400 of operation of an automated customer interaction system 112. In the method 400, a voice call is initiated between a communications device 104 operated by an end user and an automated customer interaction system 112 operated by a system user 110. In some situations, for example a consumer (i.e., end user) placing a call to a retail business (i.e., system user), the voice call is initiated by the end user via the communications device 104. In other situations, for example a political pollster (i.e., system user) placing a call to a constituent (i.e., end user), the voice call is initiated by the system user via the automated customer interaction system 112. The method 400 commences at 402.

At 404 a voice call is placed between an end user and a system user 110. The voice call may be initiated by either party using a telephonic device to dial a telephone number or similar identifier associated with the other party. Such a voice call may be placed by the end user via a communications device 104 which may include a device with or without graphical display capabilities. Such a voice call may be alternatively placed by the system user 110 using a private branch exchange (PBX) or similar telephonic switching device that is communicably coupled to the automated customer interaction system 112. In yet another alternative, such a voice call may be placed by the system user 110 directly through the automated customer interaction system 112. Such a voice call initiated by the system user 110 may, in some circumstances, originate as an automated voice call placed autonomously by the automated customer interaction system 112 (e.g., a "robocall").

At 406 the automated customer interaction system 112 determines whether the communications device 104 is associated with an authorized account holder or has sufficient graphical display capabilities to enable accurate rendering of graphical data provided by the system 112. In at least some instances for either an inbound call to or outbound call from the communications device 104, an application executed at least in part on the communications device 104 can provide an indication to the automated customer interaction system 112 permitting the system 112 to determine whether the device is a recognized or registered device capable of communication with the system 112 via an interactive graphical session using data communicated over the network data link 292. In other instances, the automated customer interaction system 112 may perform a lookup by telephone number to determine whether a particular communications device has been registered or authorized to communicate via an interactive graphical session. If, however, the automated customer interaction system 112 is unable to determine whether the communications device 104 is a recognized, registered, or authorized device, the call is completed as a voice call at 408. Alternatively, if the automated customer interaction system 112 determines that the communications device 104 is associated with an authorized account holder or possesses graphical display capabilities that meet or exceed one or more defined criteria, the automated customer interaction system 112 will commence an interactive graphical session with the communications device 104 via a graphical user interface at 410.

The decision making to forward or route the call as a voice call at 408 is transparent to the end user of the communications device 104. For example, voice calls initiated by the end user will be autonomously forwarded or routed by the automated customer interaction system 112 to a communicably coupled PBX 270 or similar telephonic switching device employed by the system user 110. Such may result in the call being variously forwarded or routed to an automated attendant, a live attendant, or a live representative. In another example, voice calls initiated by the system user 110 will be autonomously forwarded or routed by the automated customer interaction system 112 to a communicably coupled PBX 270 or similar telephonic switching device employed by the system user 110 prior to the connection of the voice call to the communications device 104. Such may result in the voice call to the end user being variously completed using an automated attendant, a live attendant, or a live representative.

The decision making to route the call through the automated customer interaction system 112 via a graphical user interface at 410 is also transparent to the end user of the communications device 104. During interactive graphical sessions, a graphical user interface will appear on the communications device display 288 at 410. In at least some instances, the automated customer interaction system 112 may provide a brief audio message to the end user indicating the call is proceeding as an interactive graphical session and that the end user should refer to the display 288 on their communications device 104 to complete the call. Throughout the interactive graphical session various icons and menu options may appear that allow the end user to choose a voice call option.

Throughout the interactive graphical session started at 408, the automated customer interaction system 112 monitors for receipt of an end user input indicative of a desire to proceed with a voice call at 412. In the event the end user elects to proceed with a voice call upon receipt of an input indicating such, the automated customer interaction system 112 will transfer, forward or otherwise route the session to a PBX 270 or similar telephonic switching device employed by the system user 110 for completion as a voice call.

Throughout the interactive graphical session started at 408, the automated customer interaction system 112 monitors for receipt of an end user input indicative of a desire to terminate the session at 414. In the event the end user elects to terminate the session at 414, the automated customer interaction system 112 will close the session and terminate the method at 416.

Figure 5:
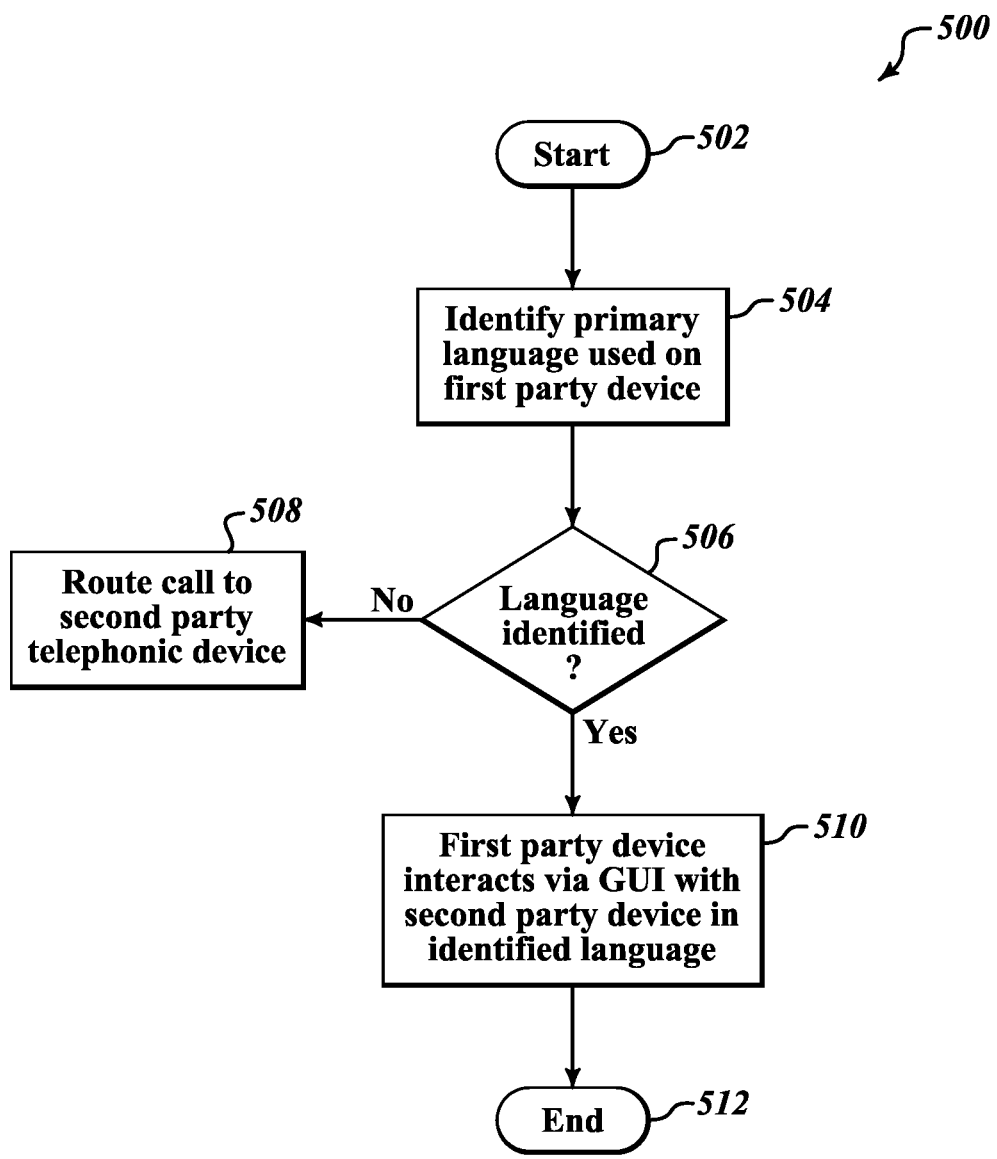
FIG. 5 is a high level logic flow diagram of a method of determining a primary communication language for an enhanced telephony service using primary language identifiers present on the caller's device, according to one illustrated embodiment.

FIG. 5 shows an example method 500 of primary language selection for an automated customer interaction system 112. In the method 500, the automated customer interaction system 112 examines call setup information obtained from the end user's communications device 104 for the presence of data indicative of a preferred language of the end user. The ability to determine a preferred language advantageously provides the automated customer interaction system 112 with the ability to provide interactive graphical sessions in the preferred language of the end user. The ability to determine a preferred language also advantageously provides the automated customer interaction system 112 with the ability to route a voice call to an automated system, live attendant, or live representative able to communicate verbally in the preferred language of the end user. Such may beneficially increase the comfort of the end user in communicating via either the graphical user interface or a voice call. The method 500 commences at 502.

At 504 the automated customer interaction system 112 determines whether the end user has established, indicated, or otherwise configured a language preference on their communications device 104. Such a determination may include examining stored data related to the authorized account associated with the communications device 104, or examining call setup information exchanged between the communications device 104 and the automated customer interaction system 112, for the presence of data indicative of a language preference on the communications device 104. In one example, the communications device operating system may contain data indicative of the end user's language preference selected upon initial configuration of the communications device 104.

At 506 the automated customer interaction system 112 determines whether a preferred language associated with the communications device 104 has been identified. In at least some situations, if a preferred language is not identified, the automated customer interaction system 112 transfers, forwards, or routes the call to a PBX 270 or similar telephonic switching device employed by the system user 110 for completion as a voice call at 508. In other situations, if a preferred language is not identified, the automated customer interaction system 112 proceeds using a defined default language selected by the system user 110 (not shown in FIG. 5).

Responsive to the determination of a preferred language at 506, at 510 the automated customer interaction system 112 proceeds with establishing either an interactive graphical session or a voice call with the communications device 104. Such may be performed, for example, using the method described in detail in FIG. 4. Based on the determined preferred language the automated customer interaction system 112 can present a graphical user interface in the preferred language (e.g., Spanish, French, German, Chinese, etc.) of the end user. Additionally, if the end user opts to complete the call as a voice call, the automated customer interaction system 112 may forward or otherwise route the voice call to an automated system, a live attendant, or a live representative conversant in the preferred language of the end user. Such may improve the level of comfort of the end user in interaction with the graphical user interface or during a voice call. The method 500 concludes at 512.

Figure 6:
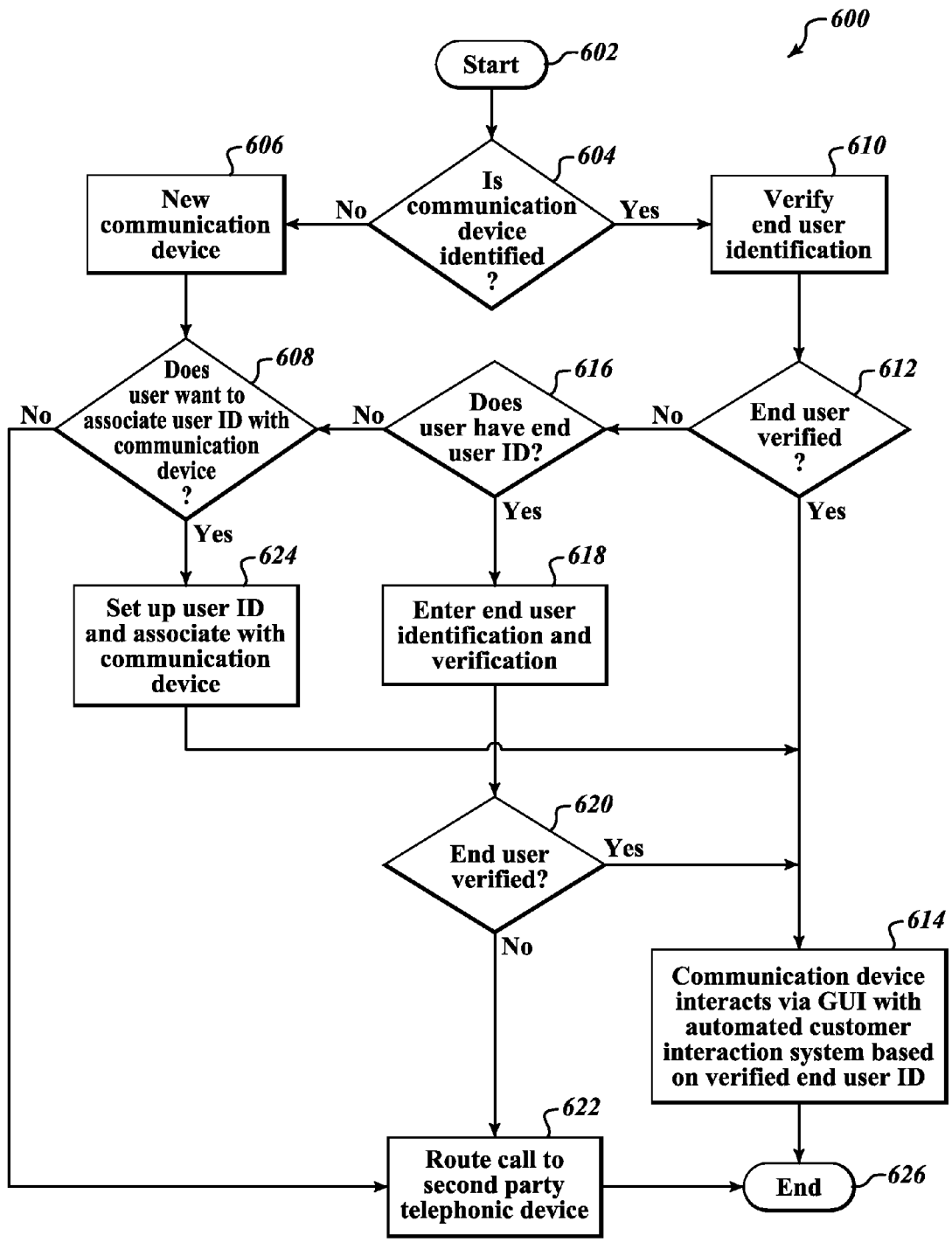
FIG. 6 is a high level logic flow diagram showing a method of performing caller verification by an illustrative enhanced telephony service, according to one illustrated embodiment.

FIG. 6 shows an example end user authentication and authentication set-up method 600 using an automated customer interaction system 112. In some instances, the automated customer interaction system 112 may be employed in instances where end user authentication is desirable or legally required. Non-limiting examples of such situations include medical and pharmacy settings covered by the Health Insurance Portability and Accountability Act (HIPAA); financial settings; acquisition of goods or services; and the like. Such may also include payment processing technologies including without limitation, credit card processing, debit card processing, prepaid card processing, or any other current or future developed payment method not reliant on an exchange of cash or similar negotiable instruments. Such authentication may be particularly desirable since the communications device 104 is often shared among multiple individuals such as family members or friends, or may be misplaced, mislaid, or stolen. In some implementations, an application or "app" executed at least in part on the communications device 104 may be used to provide authentication information or similar credentials to the automated customer interaction system 112 for verification prior to initiating an interactive graphical session with the device 104 via a network data link 292. Such authentication information or credentials may include, for example, a user name and pass code that is provided by the end user responsive to the display of prompts on the communications device 104.

As used herein, the terms "pass code," "password" and derivatives thereof are functionally equivalent and include all forms of user entered identification and verification. Such may include one or more gestures, one or more touch inputs, and any number of alphanumeric inputs including space, punctuation, and symbol characters, in any combination. As used herein the term "biometric input" and derivatives thereof include any form of physical characteristic or indicia that is capable of uniquely identifying an individual, such may include without limitation, facial recognition, fingerprint, retina scan, voiceprint, signature, and any other current or future measurable physiological parameter having such unique identification capability.

In other implementations, the automated customer interaction system 112 can store data associated with recognized, registered, or authenticated end users and communications devices 104 on local or network nontransitory storage media (e.g., a data store on a local hard drive or remote data storage). Such may include a device identifier (e.g., an equipment identification number or EIN, media access control or MAC address, network interface controller NIC address or the like) that is associated with the communications device 104, a user name or identifier associated with the end user and a password or pass code known to the end user and used to verify the identity of the individual using the communications device 104. Other verification methods, including various biometric verification methods may be employed in a similar manner. The authentication method 600 commences at 602.

In the authentication method 600, a voice call is initiated between a communications device 104 operated by an end user and an automated customer interaction system 112 operated by a system user 110. At 604 the automated customer interaction system 112 determines whether the communications device 104 is associated with a known end user. In some implementations, such a determination includes an exchange of data (e.g., EIN, user name, and pass code) between an application executed at least in part on the communications device 104 and the automated customer interaction system 112. In other implementations, such a determination may be made by the automated customer interaction system 112 based on the presence or absence within a data store of historical data linking the communications device identifier (e.g., EIN, MAC address, NIC address, IMSI, MSIN, MSISDN, etc.) with one or more particular end user identifiers (e.g., username, identifier, biometric data, etc.).

At 606, the automated customer interaction system 112 identifies a new end user based upon the receipt of an unrecognized identifier (e.g., EIN, MAC address, NIC address, IMSI, MSIN, MSISDN, etc.) that is provided by the communications device 104. Responsive to the detection of an unrecognized communications device 104 at 606, at 608 the automated customer interaction system 112 can query the end user of the communications device whether the communications device should be registered and an association between the device and the end user created. In at least some instances, responsive to the detection of a new communications device 104 at 606, at 608 the automated customer interaction system 112 may additionally or alternatively query the end user whether an existing username or identifier associated used by the end user has been previously established (not shown in FIG. 6). Such an instance may occur, for example when an end user holding an account with the system user 110 obtains a new communications device 104. In such situations, it is possible for an association or a valid authentication to exist between more than one communications device and a personal identifier associated with a single end user (e.g., a single end user owning multiple communications devices such as an iPhone® mobile phone, iPad® tablet computer, and an iPad mini® tablet computer).

If the automated customer interaction system 112 finds an existing authentication between the communications device 104 and an end user, the system 112 can verify the identity of the end user at 610. Such verification may include querying the end user to provide a defined validation code, password, pass code, biometric input, or similar identifier to the automated customer interaction system 112 via the communications device 104.

At 612, the automated customer interaction system 112 determines whether the verification provided by the end user at 610 meets one or more defined thresholds. Such defined thresholds may include matching a password, matching a pass code, verifying a piece of data known only to the end user (e.g., birth date, birth city, mother's maiden name, etc.), verifying that biometric data falls within a defined limit of biometric data previously obtained from the end user, or the like. If the automated customer interaction system 112 is able to successfully verify the identity of the end user at 612, the automated customer interaction system 112 initiates an interactive graphical session with the communications device 104 at 614.

If the automated customer interaction system 112 is unable to successfully verify the identity of the end user at 612, the system 112 can query the end user for a different authenticated user identifier at 616. Such may occur for example where more than one family member uses a common communications device 104 such as a cell phone or tablet computer. Responsive to the receipt by the automated customer interaction system 112 of end user input indicative of a different, authenticated, user identifier at 616, at 618 the automated customer interaction system 112 can request the end user provide a defined validation code, password, pass code, or biometric input associated with the user identifier to the system 112.

At 620, the automated customer interaction system 112 determines whether the verification data input provided by the end user at 618 meets one or more defined thresholds. Such defined thresholds may include matching a password, matching a pass code, verifying a piece of data known only to the end user (e.g., birth date, birth city, mother's maiden name, etc.), verifying that end user biometric data falls within a defined limit of biometric data previously obtained from the end user, or the like. If the automated customer interaction system 112 is able to successfully authenticate the identity of the end user at 618, the automated customer interaction system 112 initiates an interactive graphical session with the communications device 104 at 614.

The automated customer interaction system 112 can forward or otherwise route the call to a PBX 270 or similar telephonic switching device employed by the system user 110 for completion as a voice call at 622 responsive to an inability to verify the identity of the end user at 620. The automated customer interaction system 112 can additionally forward or otherwise route the call to a PBX 270 or similar telephonic switching device employed by the system user 110 for completion as a voice call at 622 responsive to the receipt of an input indicative of an end user not wanting to set up a new user identifier at 608.

Responsive to the identification of a new device 104 by the automated customer interaction system 112 at 606 and the receipt of an input from the end user at 608 indicative of a desire to establish an authenticated account linking the end user and the communications device 104, the automated customer interaction system 112 can query the end user to enter an identifier or username and verification data such as a password, pass code, or biometric identifier at 624. After receipt of the new user identifier and verification at 624, the automated customer interaction system 112 can store the communications device identifier along with the associated user identifier and verification in a data store prior to initiating an interactive graphical session with the communications device 104 at 614.

Advantageously, user identification or authentication of the communications device 104 permits the end user to submit payment to the automated customer interaction system 112 thereby facilitating the provision of goods and services by the system user 110 to the end user without requiring the end user to speak with an attendant or representative or requiring the end user to initiate another session (e.g., via a secure web portal) to provide payment. Such payment may be in the form of a credit card, debit card, wire transfer, bank transfer, or the like. Such payments may be facilitated by requesting the end user to provide relevant card or account information in the form of an alphanumeric string (e.g. the credit or debit card number), an image of the credit or debit card or check (e.g., taken with a camera on the communications device 104), direct authorized bank transfer via biometric identification, or any combination thereof. Additional security measures such as the use of secure hypertext transfer protocol ("https"), public/private key encryption, secure socket layer ("SSL") technology, or any other current or future data protection method may be optionally used to provide the end user with an additional sense of security. The method 600 concludes at 626.

FIG. 7A shows a method 700 illustrating only a portion of operation of a much larger illustrative automated customer interaction system 112 useful in retail pharmacy setting. FIGS. 7B to 7J are illustrative screen shots showing the content of an illustrative graphical user interface provided by the automated customer interaction system 112 to the communications device 104. Each of screen shots 7B-7J is indexed to the flow diagram 700.

In FIG. 7A, the pharmacy home screen 702 includes three option buttons and a map button. Shown linked to the map button on the pharmacy home screen 702 is an image data screen 704 that includes a map incorporating identifiers designating retail pharmacy locations in the vicinity of the end user.

A pharmacy department choice menu screen 706 that includes five option buttons and a map button is shown linked to the "PHARMACY" button on the pharmacy home screen 702. A patient choice menu screen 708 that includes five option buttons and a map button is shown linked to the "I'M A PATIENT" button on the pharmacy department choice menu screen 706.

A prescription ID data entry screen 710 that includes a text box and a virtual keyboard for alphanumeric text entry in the text box is shown linked to the "REFILL A PRESCRIPTION" button on the patient choice menu screen 708. An alphanumeric message data screen 712 that includes a message indicating a time and date the refilled prescription will be available is linked to the prescription ID data entry screen 710.

A prescription ID/phone data entry screen 714 that includes two text boxes and a virtual keyboard for alphanumeric text entry in the text boxes is shown linked to the "CHECK STATUS" button on the patient choice menu screen 708. An alphanumeric message data screen 716 that includes a message indicating a time and date the refilled prescription will be available is linked to the prescription ID/phone data entry screen 714.

A voice call screen 718 generated by the operating system of the communications device 104 is shown linked to the "LEAVE A MESSAGE" and "SPEAK TO A PHARMACIST" buttons on the patient choice menu screen 708. Although both the "LEAVE A MESSAGE" and "SPEAK TO A PHARMACIST" buttons are shown linked to a common telephone number for convenience and ease of illustration, no such linkage to a common number should be implied or inferred. Within the automated customer interaction system 112 each of the buttons may be linked to different telephone numbers, for example the "LEAVE A MESSAGE" button may be linked to a first telephone number assigned to an answering machine while the "SPEAK TO A PHARMACIST" button may be linked to a second telephone number assigned to a telephone on the desk usually occupied by the pharmacist on duty.

FIG. 7B is a larger screen shot of the illustrative pharmacy home screen 702. Visible on the pharmacy home screen 702 are a "PHARMACY DEPARTMENT" button 724 that can be selected by the end user to access services provided by the pharmacy, an "ALL DEPARTMENTS" button 726 that can be selected by the end user to access services provided by all other store departments, and an "END" button 728 that can be selected by the end user to end the session/call. Also visible on the pharmacy home screen 702 are a "MAP" button 722 that can be selected by the end user to display a map showing the location of nearby pharmacies and a text listing 730 of the hours of operation of the store and pharmacy.

FIG. 7C is a larger screen shot of the illustrative map image data screen 704. Visible on the map image data screen 704 is a map showing retail pharmacy locations in the vicinity of the end user. Of note, at least a portion of the data displayed in the map image may be provided by a third party (i.e., a party other than the end user or the system user 110), for example a commercial map application such as Google Maps®. In at least some instances, the operating system of, or one or more applications native to, the communications device 104 may be used to provide some or all of the map image data, location data, environmental data, or combinations thereof. For example, a global positioning system (GPS) receiver within the communications device 104 may provide location data relevant to the present location of the end user such that the geographically closest retail pharmacies are displayed on the map image data screen 704 responsive to the end user selecting the map icon on the pharmacy home screen 702.

Figure 7D:
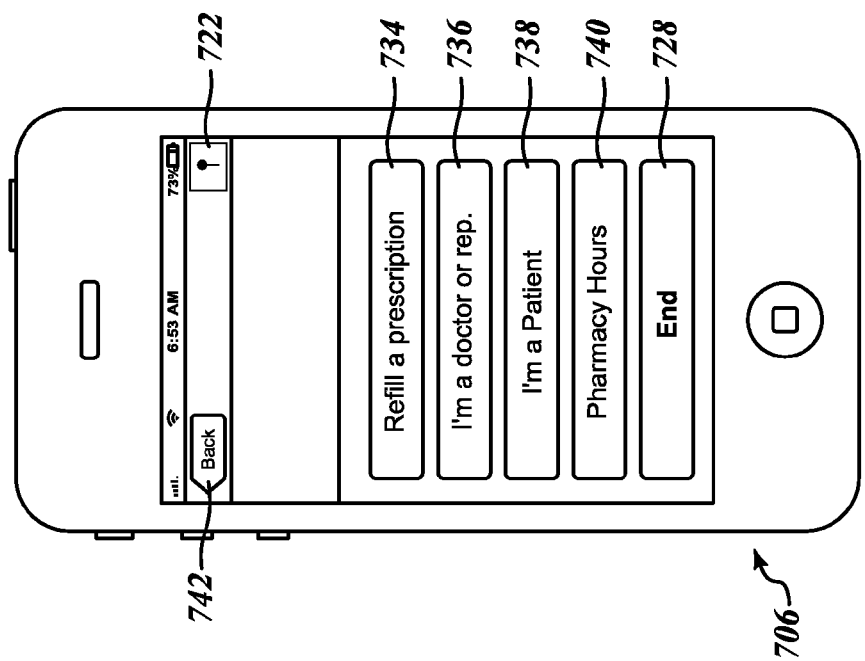
FIG. 7D is a graphical user interface screen that displays an illustrative selection menu screen provided by the enhanced telephony service responsive to a user input selecting the "PHARMACY DEPARTMENT" button displayed on the graphical user interface entry menu shown in FIG. 7B, according to one illustrated embodiment.

FIG. 7D is a larger screen shot of the illustrative pharmacy department choice menu screen 706. Visible on the pharmacy department choice menu screen 706 are a "REFILL A PRESCRIPTION" button 734 that can be selected by the end user to order a prescription refill, an "I'M A DOCTOR OR REP." button 736 that can be selected by the end user to a access a specialized physician menu, an "I'M A PATIENT" button 738 that can be selected by the end user to access a specialized patient menu, a "PHARMACY HOURS" button 740 that can be selected by the end user to access a listing of the pharmacy hours, and an "END" button 728 that can be selected by the end user to end the session/call. Also visible on the pharmacy department choice menu screen 706 are a "MAP" button 722 that can be selected by the end user to display a map showing the location of nearby pharmacies and a "BACK" button 742 that when selected by the end user returns the graphical user interface to the immediately preceding screen.

FIG. 7E is a larger screen shot of the illustrative patient choice menu screen 708. Visible on the patient choice menu screen 708 are the "REFILL A PRESCRIPTION" button 734, a "LEAVE A MESSAGE" button 746 that can be selected by the end user to initiate a voice call and leave a voice message for pharmacy personnel, a "CHECK STATUS" button 748 that can be selected by the end user to access updated information on whether a prescription is ready for pickup, a "SPEAK TO A PHARMACIST" button 750 that can be selected by the end user to initiate a voice call to a pharmacist, and an "END" button 728 that can be selected by the end user to end the session/call. Also visible on the patient choice menu screen 708 are the "MAP" button 722 and the "BACK" button 742.

Figure 7G:
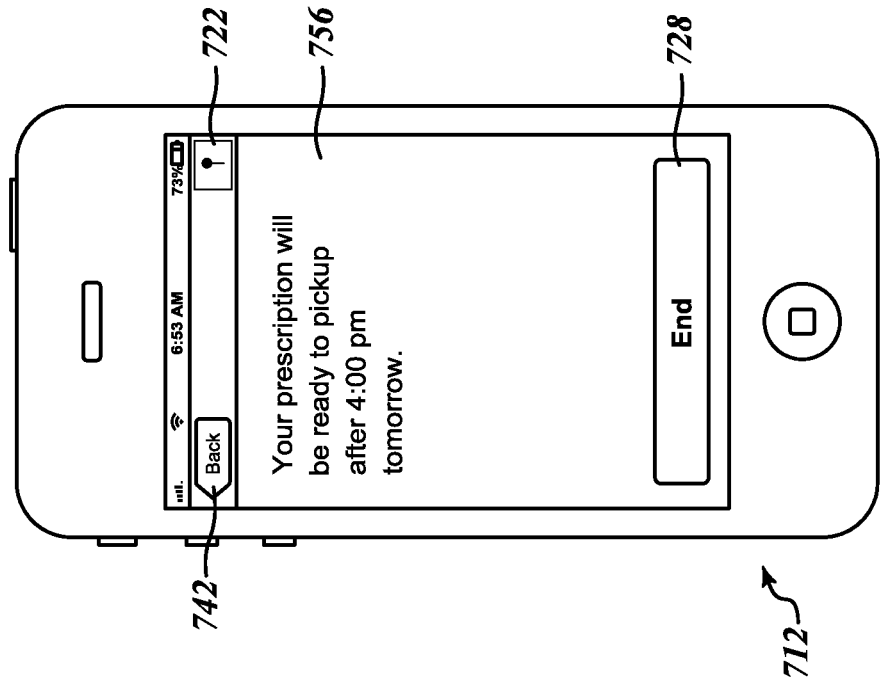
FIG. 7G is a graphical user interface screen that displays an illustrative data screen provided by the enhanced telephony service responsive to a user input including data indicative of a "PRESCRIPTION ID" in the text field shown in FIG. 7F, according to one illustrated embodiment.
Figure 7F:
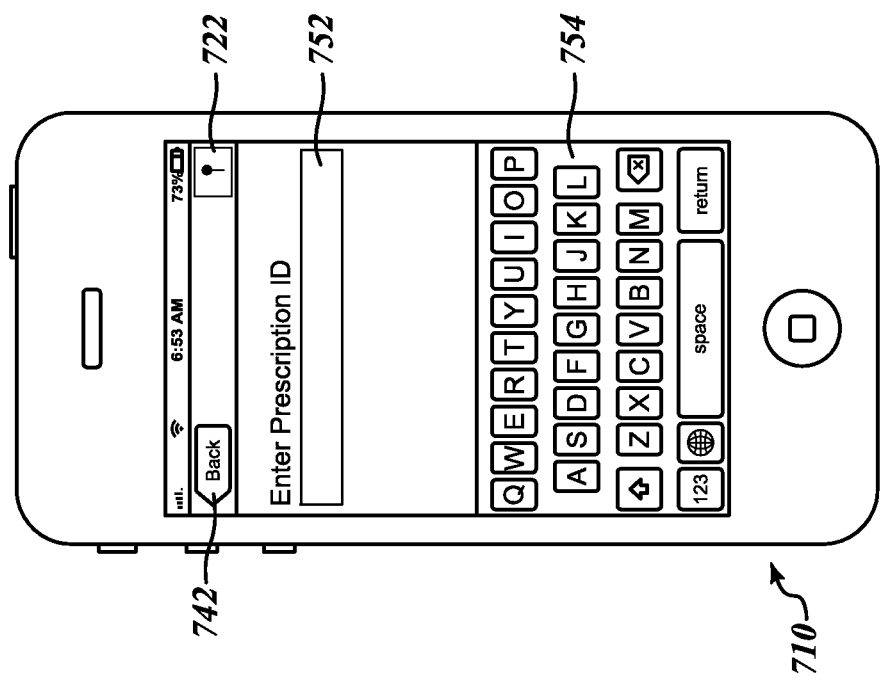
FIG. 7F is a graphical user interface screen that displays an illustrative selection data (text) entry screen provided by the enhanced telephony service responsive to a user input selecting the "REFILL A PRESCRIPTION" button displayed on the graphical user interface entry menu shown in FIG. 7E, according to one illustrated embodiment.

FIG. 7F is a larger screen shot of the illustrative prescription ID data entry screen 710. Visible on the prescription ID data entry screen 710 is a text box 752 in which the end user can enter an alphanumeric string corresponding to a prescription identifier for a prescription that the end user desires to refill. Also visible on the prescription ID data entry screen 710 is a virtual keyboard 754 to facilitate the entry of the alphanumeric text. In some instances a physical keyboard (not shown in FIG. 7F) on the communications device 104 may be used to enter alphanumeric text in the text box 752. Also visible on the prescription ID data entry screen 710 are the "MAP" button 722 and the "BACK" button 742.

FIG. 7G is a larger screen shot of the illustrative alphanumeric message data screen 712. After entering the prescription identification on the prescription ID data entry screen 710, the automated customer interaction system 112 can display an updated status message related to the prescription. In this instance, the message 758 indicates the prescription will be available for pick up the following day at 4:00 P.M. Also visible on the alphanumeric message data screen 712 are the "MAP" button 722, the "END" button 728 and the "BACK" button 742.

Figure 7I:
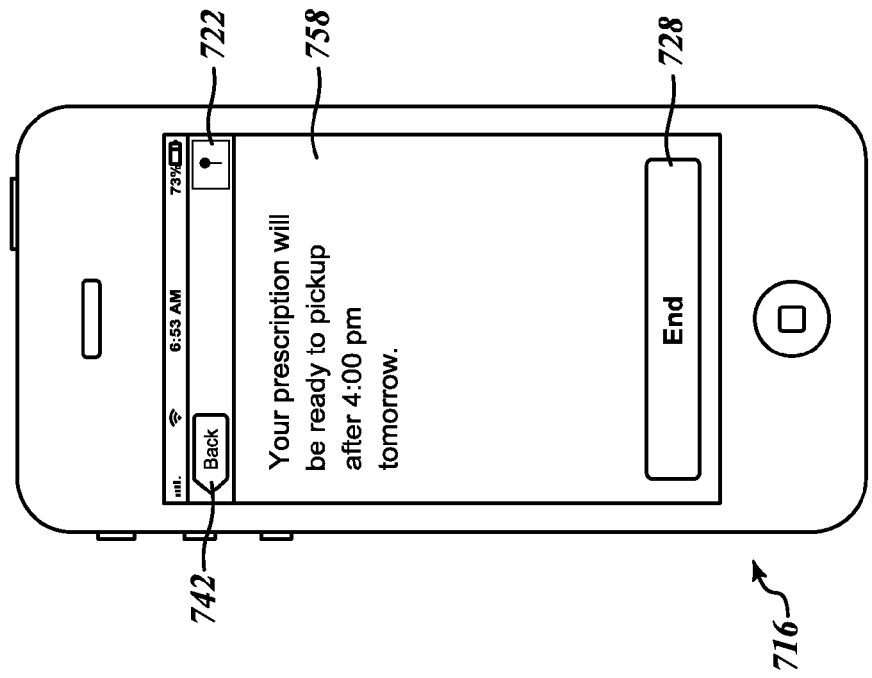
FIG. 7I is a graphical user interface screen that displays an illustrative data screen provided by the enhanced telephony service responsive to a user input including data indicative of a "PRESCRIPTION ID" and/or "PHONE NUMBER" in the respective text field shown in FIG. 7H, according to one illustrated embodiment.
Figure 7H:
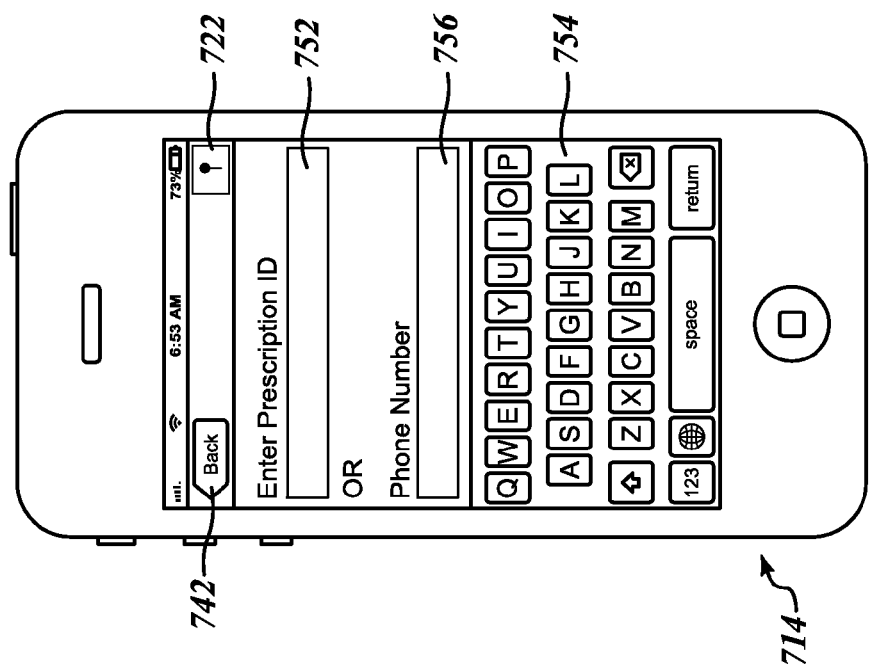
FIG. 7H is a graphical user interface screen that displays an illustrative selection data (text) entry screen provided by the enhanced telephony service responsive to a user input selecting the "CHECK STATUS" button displayed on the graphical user interface entry menu shown in FIG. 7E, according to one illustrated embodiment.

FIG. 7H is a larger screen shot of the illustrative prescription ID/phone data entry screen 714. Visible on the prescription ID/phone data entry screen 714 is the text box 752 and a "PHONE NUMBER" text box in which the end user can enter an alphanumeric string corresponding to a telephone number associated with a prescription for which the end user desires to check the status. Also visible on the prescription ID/phone data entry screen 714 is the virtual keyboard 754. Also visible on the prescription ID/phone data entry screen 714 are the "MAP" button 722 and the "BACK" button 742.

FIG. 7I is a larger screen shot of the illustrative alphanumeric message data screen 716. After entering the prescription identification or telephone number on the prescription ID/phone data entry screen 714, the automated customer interaction system 112 can display an updated status message related to the prescription. In this instance, the message 758 indicates the prescription will be available for pick up the following day at 4:00 P.M. Also visible on the alphanumeric message data screen 716 are the "MAP" button 722, the "END" button 728 and the "BACK" button 742.

Figure 7J:
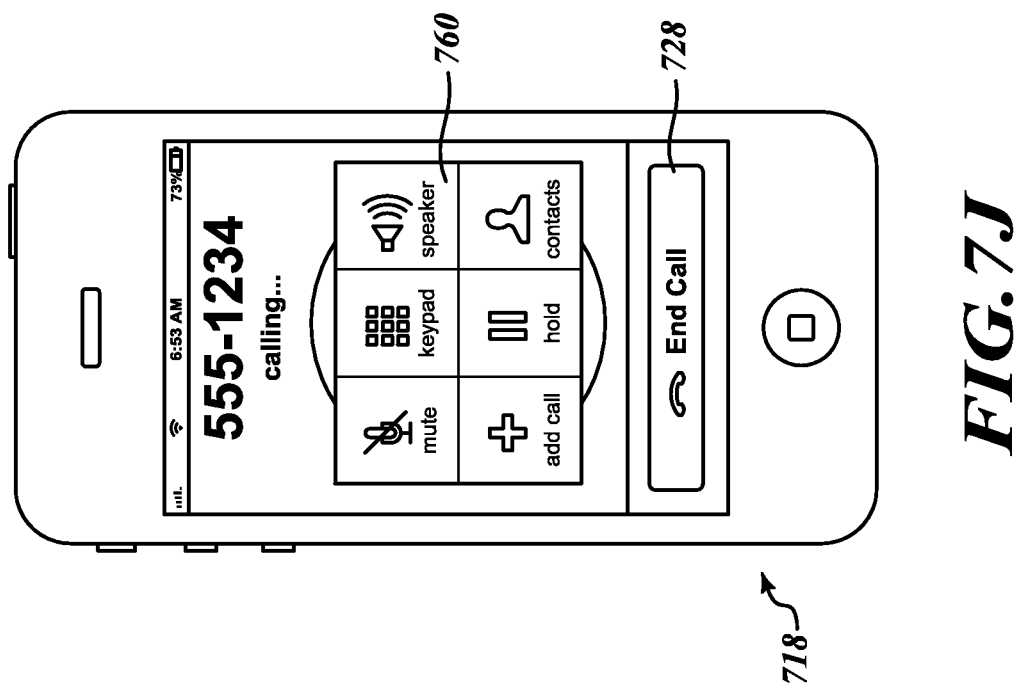
FIG. 7J is a graphical user interface screen that displays an illustrative voice call screen provided by the enhanced telephony service responsive to a user input selecting a "TALK TO PHARMACIST" button or a "LEAVE A MESSAGE"

FIG. 7J is a larger screen shot of the illustrative voice call screen 718. Responsive to the receipt of an end user input to the automated customer interaction system 112 indicative of a selection to either "LEAVE A MESSAGE" or "SPEAK TO A PHARMACIST" on the patient choice menu screen 708, the system 112 can forward or otherwise route the session/call to a PBX 270 or similar telephonic switching device employed by the system user 110 for completion as a voice call. In at least some instances, the operating system of, or one or more applications native to, the communications device 104 may be used to provide some or all of the voice call functionality or capability, including all or a portion of the graphical user interface associated with placing a voice call.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automated systems, not necessarily the exemplary customer interaction system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of automating customer interaction via a variety of types of communications devices, the method comprising:
    receiving a plurality of inquiries by an automated customer interaction system, each of the received inquiries associated with a respective attempt at placing a respective voice call via each of a plurality of communications devices; and
    for each of the received inquiries:
        determining, by the automated customer interaction system and based at least in part on a unique identification of the respective communications device, whether the respective communications device is logically associated with a respective one of a plurality of user accounts; and
        for at least some of the received inquiries:
            in response to determining that the respective communications device is logically associated with a respective one of the plurality of user accounts, causing at least one set of graphical prompts to be displayed by the respective communications device.

2. The method of claim 1, further comprising:
    for each of at least some of the received inquiries:
    in response to determining that the respective communications device is not logically associated with a respective one of the plurality of user accounts, causing an initial set of audio prompts to be audibly delivered to an end user by the respective communications device.

3. The method of claim 2 wherein causing an initial set of audio prompts to be audibly delivered to an end user by the respective communications device includes transmitting, by the automated customer interaction system, the at least one set of audio prompts to the respective communications device over a data network.

4. The method of claim 2 wherein causing an initial set of audio prompts to be audibly delivered to an end user by the respective communications device includes causing the communications device to complete the respective voice call via a voice network.

5. The method of claim 1, further comprising, for each of at least some of the received inquiries:
    in response to determining that the respective communications device is not logically associated with a respective one of a plurality of user accounts,
        determining whether the respective communications device via which the respective voice call is attempted is capable of displaying graphical prompts and receiving user input in response to graphical prompts; and
        in response to determining that the respective communications device is capable of displaying graphical prompts and receiving user input in response to graphical prompts, causing at least an initial set of graphical prompts of the at least one set of graphical prompts to be displayed by the respective communications device.

6. The method of claim 5, further comprising, for each of at least some of the received inquiries:
    in response to determining that the respective communications device is not capable of displaying graphical prompts and receiving user input in response to graphical prompts, causing an initial set of audio prompts to be audibly delivered to an end user by the respective communications device.

7. The method of claim 5 wherein causing at least an initial set of graphical prompts to be displayed by the respective communications device includes causing an account credential specification set of graphical prompts of the at least one set of graphical prompts to be displayed by the respective communications device, where the account credential specification set of graphical prompts includes at least one graphical user selectable icon, such that selection of the icon:
    allows entry of a set of account credentials by the end user of the respective communications device, the set of account credentials including at least a user identifier and a user pass code, the user pass code different from the user identifier and logically associated therewith in at least one nontransitory processor-readable medium; or
    causes display of at least one additional user selectable icon that allows entry of the set of account credentials by the end user of the respective communications device.

8. The method of claim 1 wherein causing at least an initial set of graphical prompts to be displayed by the respective communications device includes causing display of at least one user selectable icon, such that selection of the icon:
  allows entry of a user specific pass code by the end user of the respective communications device; or
  causes display of at least one additional user selectable icon that allows entry of the user specific pass code by the end user of the respective communications device.

9. The method of claim 8 wherein causing an initial set of graphical prompts of the at least one set of graphical prompts to be displayed by the respective communications device includes causing display of a user selectable icon, selection of which causes a voice connection with a human representative to be established via the respective communications device.

10. The method of claim 9 wherein causing an initial set of graphical prompts of the at least one set of graphical prompts to be displayed by the respective communications device further includes causing a display of at least one graphical user selectable icon such that selection of the graphical user selectable icon causes display of an account credential specification set of graphical prompts, where the account credential specification set of graphical prompts:
  allows entry of a set of account credentials by the end user of the respective communications device, the set of account credentials including at least a user identifier and a user pass code, the user pass code different from the user identifier and logically associated therewith in at least one nontransitory processor-readable medium; or
  causes display of at least one additional user selectable icon that allows entry of a set of account credentials by the end user of the respective communications device.

11. The method of claim 9, further comprising:
receiving a user specific pass code entered by a user of the respective communications device; and
attempting to verify the received user specific pass code.

12. The method of claim 11, further comprising:
in response to successfully verifying the received user specific pass code, causing a navigation set of user selectable prompts of the at least one set of graphical prompts to be displayed by the respective communications device, the navigation set of graphical prompts including a number of user selectable icons selection of which causes display of at least one further set of graphical prompts by the respective communication device.

13. The method of claim 12 wherein the navigation set of graphical prompts includes a respective user selectable account icon for each of a plurality of accounts maintained for the respective end user.

14. The method of claim 13, further comprising:
in response to selection of one of the user selectable account icons, causing an actions set of user selectable graphical prompts to be displayed by the respective communications device, the actions set of graphical prompts including a number of user selectable action icons that specify respective actions specific to an account type of the selected one of the accounts.

15. The method of claim 14, further comprising:
in response to selection of one of the user selectable action icons, causing information specific to the selected one of the accounts for the respective end user to be displayed by the respective communications device.

16. The method of claim 15, further comprising:
in response to selection of one of the user selectable action icons, causing the communications device to display a user selectable location sharing icon, selection of which causes a sharing of location information with the automated customer interaction system by the respective communications device:
  receiving location data by the automated customer interaction system in response to selection of the user selectable location sharing icon;
  in response to receiving location data, causing the respective communications device to display a map including information based at least in part on the received location data and on the action associated with the selected one of the user selectable action icons.

17. The method of claim 14, further comprising:
in response to selection of one of the user selectable action icons, causing the respective communications device to display a calendar interface for calendaring an event;
receiving event information via the calendar interface; and
in response to receiving the event information, calendaring the event in at least one calendar data store stored on at least one nontransitory processor-readable medium.

18. The method of claim 1, further comprising:
causing the respective communications device to present a user selectable complete call icon, selection of which causes a completed call to be established via the respective communications device, the completed call including a voice connection with a human representative.

19. The method of claim 18, further comprising:
during the completed call, causing the respective communications device to present a user selectable screen sharing icon, selection of which causes the respective communications device to share a screen of the respective communications device with a remote entity.

20. The method of claim 18, further comprising:
during the completed call, causing the respective communications device to present a user selectable image sharing icon, selection of which causes the respective communications device to share one or more images or video with a remote entity.

21. The method of claim 18, further comprising:
during the completed call, causing the respective communications device to present a user selectable camera sharing icon, selection of which causes the respective communications device to share a camera of the respective communications device with a remote entity.

22. The method of claim 18, further comprising:
during the completed call, causing the respective communications device to present a user selectable file sharing icon, selection of which causes the respective communications device to share a file with a remote entity.

23. The method of claim 18, further comprising:
during the completed call, causing the respective communications device to present a user selectable contacts sharing icon, selection of which causes the respective communications device to share a contacts information with a remote entity.

24. The method of claim 18, further comprising:
during the completed call, causing the respective communications device to present a user selectable icon selection of which causes the respective communications device to leave a voicemail message.

25. The method of claim 1, further comprising:
causing the respective communications device to present a number of user enterable fields to specify at least one identifier associated with at least one of a good, a service or an account.

26. The method of claim 25, further comprising:
receiving at least one identifier;

receiving a date of availability for a specified one of the good or the service; and electronically logging an order for the good or the service identified by the received identifier for the end user associated with the respective communications device or account.

27. The method of claim 1, further comprising:
causing the respective communications device to present a number of user enterable fields to specify a date of availability for the good or service to be picked up or delivered.

28. The method of claim 1 wherein causing the at least one set of graphical prompts to be displayed by the respective communications device includes autonomously causing the at least one set of graphical prompts to be displayed by an operating system of the respective communications device.

29. The method of claim 1 wherein causing at least one set of graphical prompts to be displayed by the respective communications device includes transmitting, by the automated customer interaction system, the at least one set of graphical prompts to the respective communications device over a data network.

30. The method of claim 1 wherein causing at least one set of graphical prompts to be displayed by the respective communications device is performed in lieu of completing the call attempt at a then current time.

31. The method of claim 1, further comprising:
causing the respective communications device to present a number of messages in a dedicated message field.

32. The method of claim 1, further comprising:
causing the respective communications device to present a number of advertising messages in a dedicated advertising message field.

33. The method of claim 1, further comprising, for each of at least some of the received inquiries:
in response to determining that the respective communications device is logically associated with a respective one of the plurality of accounts, determining, by the automated customer interaction system, whether a language preference is associated with the respective communications device;
in response to determining a language preference is associated with the respective communications device, causing the at least one set of graphical prompts in the preferred language associated with the communications device to be displayed by the respective communications device; and
in response to determining a language preference is not associated with the respective communications device, causing the at least one set of graphical prompts in a default language to be displayed by the respective communications device.

34. The method of claim 33, further comprising, for each of at least some of the received inquiries:
in response to determining that the respective communications device is not logically associated with a respective one of the plurality of accounts, determining, by the automated customer interaction system, whether the respective communications device contains data indicative of a language preference associated with the respective communications device and whether the respective recipient communications device is capable of displaying graphical prompts and capable of receiving user input in response to graphical prompts;
in response to determining a language preference is associated with the respective communications device and that the respective communications device is capable of displaying graphical prompts and receiving user input in response to graphical prompts, causing, by the automated customer interaction system, at least one set of graphical prompts in the preferred language to be displayed on the respective communications device; and
in response to determining a language preference is not associated with the respective communications device and that the respective communications device is capable of displaying graphical prompts and receiving user input in response to graphical prompts, causing, by the automated customer interaction system, at least one set of graphical prompts in the default language to be displayed on the respective recipient communications device.

35. The method of claim 1 wherein causing at least one set of graphical prompts to be displayed by the respective communications device includes:
causing at least one set of graphical prompts useful in completing a financial transaction between the automated customer interaction system and an end user to be displayed by the respective communications device.

36. The method of claim 35 wherein causing at least one set of graphical prompts useful in completing a financial transaction between the automated customer interaction system and an end user to be displayed by the respective communications device includes:
causing at least one set of graphical prompts useful in completing at least one of: a credit card transaction, a debit card transaction, a prepaid card transaction, or a checking account transaction to be displayed by the respective communications device.

37. The method of claim 36 wherein causing at least one set of graphical prompts useful in completing a financial transaction between the automated customer interaction system and an end user to be displayed by the respective communications device includes:
transmitting at least one set of graphical prompts useful in completing the financial transaction is performed using a secure communicable coupling between the automated customer interaction system and the respective communications device; and
transmitting data representative of the financial transaction via the secure communicable coupling between the automated customer interaction system and the respective communications device.

38. The method of claim 36 wherein transmitting data representative of the financial transaction via the secure communicable coupling between the automated customer interaction system and the respective communications device includes:
transmitting data representative of at least one of: an alphanumeric character string associated with the credit card, an alphanumeric character string associated with the debit card, an alphanumeric character string associated with the prepaid card, an alphanumeric character string associated with the checking account, an image of the credit card; an image of the debit card, an image of the prepaid card, an image of a check drawn on the checking account, or an image associated with one or more biometric parameters of the end user authorizing the payment.

39. An automated customer interaction system to automate customer interaction via a variety of types of customer used communications devices, the automated customer interaction system comprising:
at least one nontransitory processor-readable medium;

at least one processor communicatively coupled to the at least one nontransitory processor-readable medium, wherein the at least one processor receives a plurality of inquiries, each of the received inquiries associated with a respective attempt at placing a respective call via each of a plurality of respective communications devices;

for each of the received inquiries:

uniquely identifies the respective communications device;

determines, based at least in part on the unique identification, whether the respective communications device is logically associated with a respective one of the plurality of accounts; and for at least some of the received inquiries:

in response to a determination that the respective communications device is logically associated with a respective one of the plurality of accounts, causes at least one set of graphical prompts to be displayed by the respective communications device.

\* \* \* \* \*